US010678824B2

(12) United States Patent
Inagaki

(10) Patent No.: US 10,678,824 B2
(45) Date of Patent: *Jun. 9, 2020

(54) METHOD OF SEARCHING FOR RELEVANT NODE, AND COMPUTER THEREFOR AND COMPUTER PROGRAM

(71) Applicant: International Business Machines Corporation, Armonk, NY (US)

(72) Inventor: Takeshi Inagaki, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 98 days.

This patent is subject to a terminal disclaimer.

(21) Appl. No.: 15/944,527

(22) Filed: Apr. 3, 2018

(65) Prior Publication Data

US 2018/0225371 A1  Aug. 9, 2018

Related U.S. Application Data

(63) Continuation of application No. 14/695,147, filed on Apr. 24, 2015, now Pat. No. 9,965,551.

(30) Foreign Application Priority Data

May 26, 2014  (JP) ................. 2014-108020

(51) Int. Cl.
G06F 16/34 (2019.01)
G06F 16/33 (2019.01)
(Continued)

(52) U.S. Cl.
CPC .......... G06F 16/34 (2019.01); G06F 16/3344 (2019.01); G06F 16/9024 (2019.01); G06F 16/9038 (2019.01); G06F 40/30 (2020.01)

(58) Field of Classification Search
CPC .......... G06F 17/30657; G06F 17/2785; G06F 17/30106; G06F 17/30684; G06F 17/30716
See application file for complete search history.

(56) References Cited

U.S. PATENT DOCUMENTS 8,319,796 B2   11/2012  Wexler et al.
2006/0200461 A1  9/2006  Lucas et al.
(Continued)

FOREIGN PATENT DOCUMENTS

JP   H0876951 A    3/1996
JP   H08255253 A  10/1996
(Continued)

OTHER PUBLICATIONS

RDF, Title: "Resource Description Framework (RDF)",—Semantic Web Standards, "http://www.w3.org/RDF/", accessed May 26, 2014, 2 pages.
(Continued)

Primary Examiner — Angelica Ruiz
(74) Attorney, Agent, or Firm — Kelsey M. Skodje

(57) ABSTRACT

Embodiments of the present invention is a technique of searching for relevant nodes. This technique may include: in response to selection of a first node, displaying, as first relevant nodes, nodes having a first relevance of at least a predetermined value among nodes connected from the first node by two hops; and, in response to selection of at least one of the first relevant nodes, displaying the selected first relevant node as a second node involving the first node. This technique may further include displaying, as second relevant nodes, nodes having a second relevance of at least a predetermined value among nodes connected from the second node by two hops.

8 Claims, 20 Drawing Sheets

(51) Int. Cl.
*G06F 16/901* (2019.01)
*G06F 16/9038* (2019.01)
*G06F 40/30* (2020.01)

(56) References Cited

U.S. PATENT DOCUMENTS

| | | | |
|---|---|---|---|
| 2007/0038610 A1 | 2/2007 | Omoigui | |
| 2007/0239423 A1 | 10/2007 | Miller | |
| 2008/0263022 A1 | 10/2008 | Kostorizos et al. | |
| 2010/0082651 A1 | 4/2010 | Akolkar et al. | |
| 2010/0124209 A1 | 5/2010 | In et al. | |
| 2012/0036126 A1 | 2/2012 | Kawamura et al. | |
| 2013/0166601 A1* | 6/2013 | Chrapko | G06Q 10/00 707/798 |
| 2014/0046983 A1* | 2/2014 | Galloway | G06Q 30/0201 707/798 |
| 2014/0250377 A1 | 9/2014 | Bisca et al. | |

FOREIGN PATENT DOCUMENTS

| | | |
|---|---|---|
| JP | H10198703 A | 7/1998 |
| JP | 2000047778 A | 2/2000 |
| JP | 2004318831 A | 11/2004 |
| JP | 2005327285 A | 11/2005 |
| JP | 2006302085 A | 11/2006 |
| JP | 2007026210 A | 2/2007 |
| JP | 2011118783 A | 6/2011 |
| JP | 2013218554 A | 10/2013 |

OTHER PUBLICATIONS

RDF 1.1 Concepts and Abstract Syntax, http://www.w3.org/Tr/2014/Rec-rdf11-concepts-20140225/, accessed May 2, 2014, pp. 1-22.

Inagaki, T., "Method of Searching for Relevant Node, and Computer Therefor and Computer Program," JP Patent Application 2014-108020, Filed May 26, 2014.

Decision to Grant a Patent, JP Patent Application No. 2014-108020, dated Apr. 19, 2016.

Inagaki, T., "Method of Searching for Relevant Node, and Computer Therefor and Computer Program," U.S. Appl. No. 15/420,223, filed Jan. 31, 2017.

Inagaki, T., "Method of Searching for Relevant Node, and Computer Therefor and Computer Program," U.S. Appl. No. 14/695,147, filed Apr. 24, 2015.

List of IBM Patents or Patent Applications Treated as Related, Signed Apr. 3, 2018, 2 pages.

\* cited by examiner

| SUBJECT | PREDICATE | OBJECT |
|---|---|---|
| COFFEE | GO WELL WITH | CAKE |
| MINERAL WATER | GO WELL WITH | STEAK |
| JUICE | GO WELL WITH | CAKE |
| JUICE | GO WELL WITH | STEAK |
| COFFEE GOES WELL WITH CAKE | C | 2 |
| MINERAL WATER GOES WELL WITH STEAK | C | 5 |
| JUICE GOES WELL WITH CAKE | C | 10 |
| JUICE GOES WELL WITH STEAK | C | 6 |

501

A: rows 1–4; B: rows 5–8

| SUBJECT | PREDICATE | OBJECT |
|---|---|---|
| STUDENT | ORDER | CAKE |
| STUDENT | ORDER | STEAK |
| COMPANY EMPLOYEE | ORDER | STEAK |
| COMPANY EMPLOYEE | ORDER | PASTA |
| STUDENT ORDERS CAKE | C | 10 |
| STUDENT ORDERS STEAK | C | 2 |
| COMPANY EMPLOYEE ORDERS STEAK | C | 7 |
| COMPANY EMPLOYEE ORDERS PASTA | C | 8 |

502

A: rows 1–4; B: rows 5–8

FIG. 5A

| SUBJECT | PREDICATE | OBJECT |
|---|---|---|
| COFFEE | GO WELL WITH | CAKE |
| MINERAL WATER | GO WELL WITH | STEAK |
| JUICE | GO WELL WITH | CAKE |
| JUICE | GO WELL WITH | STEAK |
| COFFEE GOES WELL WITH CAKE | C | 2 |
| MINERAL WATER GOES WELL WITH STEAK | C | 5 |
| JUICE GOES WELL WITH CAKE | C | 10 |
| JUICE GOES WELL WITH STEAK | C | 6 |
| COFFEE GOES WELL WITH | SA | 2 |
| COFFEE GOES WELL WITH | SS | 2 |
| MINERAL WATER GOES WELL | SA | 5 |
| MINERAL WATER GOES WELL | SS | 5 |
| JUICE GOES WELL | SA | 8 |
| JUICE GOES WELL | SS | 16 |
| GO WELL WITH CAKE | OA | 6 |
| GO WELL WITH CAKE | OS | 12 |
| GO WELL WITH STEAK | OA | 5.5 |
| GO WELL WITH STEAK | OS | 11 |
| GO WELL WITH | T | 23 |

503

A: rows 1–4
B: rows 5–8
C: rows 9–19

| SUBJECT | PREDICATE | OBJECT |
|---|---|---|
| STUDENT | ORDER | CAKE |
| STUDENT | ORDER | STEAK |
| COMPANY EMPLOYEE | ORDER | STEAK |
| COMPANY EMPLOYEE | ORDER | PASTA |
| STUDENT ORDERS CAKE | C | 10 |
| STUDENT ORDERS STEAK | C | 2 |
| COMPANY EMPLOYEE ORDERS STEAK | C | 7 |
| COMPANY EMPLOYEE ORDERS PASTA | C | 8 |
| STUDENT ORDERS | SA | 6 |
| STUDENT ORDERS | SS | 12 |
| COMPANY EMPLOYEE ORDERS | SA | 7.5 |
| COMPANY EMPLOYEE ORDERS | SS | 15 |
| ORDERS CAKE | OA | 10 |
| ORDERS CAKE | OS | 10 |
| ORDERS STEAK | OA | 4.5 |
| ORDERS STEAK | OS | 9 |
| ORDERS PASTA | OA | 8 |
| ORDERS PASTA | OS | 8 |
| ORDER | T | 27 |

504

A: rows 1–4
B: rows 5–8
C: rows 9–19

FIG. 5B

METHOD OF SEARCHING FOR RELEVANT NODE, AND COMPUTER THEREFOR AND COMPUTER PROGRAM

BACKGROUND

The present invention relates to a technique of searching for relevant nodes. In particular, embodiments of the present invention relate to a technique of searching for relevant nodes connected by two hops.

Information can be taken as detailed component data from a text document using a text analysis method. For instance, nouns, verbs and the like that accompany a specific name of metal and are used in a segment can be taken out. However, thus mechanically extracted component data significantly varies and includes good and bad. Accordingly, in many cases, such component data cannot be used as it is.

Conventional methods allow for the extraction of useful information from mechanically extracted component data, through use of statistical analysis. For instance, if social networking services (SNSs) can identify combinations between messages on products or messages on movies and users having written the messages and aggregating the identified combinations can identify genres of movies tend to be referred to by users having referred to specific products. This identification allows more effective advertisements on, e.g., the SNS to be provided for the users. The conventional statistical analysis method requires that a schema is designed for each purpose, data acquired through text analysis is reaggregated into a layout allowing software capable of analyzing the data to analyze the data, and the data is input again.

It may be desirable to clarify relationships that do not explicitly appear in texts and relationships that are difficult to be found by people, to allow data analysis through the software without reaggregating, and to provide an analysis environment that can achieve an analysis method by means of advanced search, such as search in consideration of meaning, instead of simple search, through implementation in software for utilizing non-structured data.

SUMMARY

In an embodiment of the present invention, a method of searching for relevant nodes is disclosed. The method may cause a computer to execute the steps of: in response to selection of a first node, displaying, as first relevant nodes, nodes having a first relevance of at least a predetermined value among nodes connected from the first node by two hops; and in response to selection of at least one of the first relevant nodes, displaying the selected first relevant node as a second node involving the first node. The computer may execute the step of displaying the first relevant node in response to selection of the first node by a user or the computer.

The method may further cause the computer to execute a step of displaying, as second relevant nodes, nodes having a second relevance of at least a predetermined value among nodes connected from the second node by two hops. The computer may execute the step of displaying the second relevant node in response to selection of the second node by a user or the computer.

The method may further cause the computer to execute a step of, in response to selection of at least one of the second relevant nodes, displaying the selected second relevant node as a third node involving the second node.

The step of displaying the selected first relevant node as the second node involving the first node may further include a step of adding an internal link between the first node and the selected first relevant node.

The step of displaying the selected first relevant node as the second node involving the first node may further include a step of renormalizing the first node and the selected first relevant node to have a zero hop.

The step of displaying the selected second relevant node as the third node involving the second node may further include a step of adding an internal link between the second node and the selected second relevant node.

The step of displaying the selected second relevant node as the third node involving the second node may further include a step of renormalizing the second node and the selected second relevant node to have a zero hop.

In an embodiment, each of the first relevance and the second relevance may be calculated using a triple. The triple may be represented by {subject, predicate, object}. The number of occurrences of the same triple may be stored as a triple.

The method may further cause the computer to calculate a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all numbers of occurrences of designated {predicate}, and store each of the calculated values as a triple.

The method may further cause the computer to execute a step of calculating a score of an edge on each of nodes connected from the first node by two hops, based on the number of occurrences of the same triple, a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all the designated numbers of occurrences of designated {predicate}, and storing each calculated score as a triple.

The method may further cause the computer to execute a step of, if multiple edges exist between the first node and one node connected from the first node by two hops, calculating a score of all the edges based on the score of each of the edges, and storing the calculated score as a triple, to regard the calculated score as a score of one node connected from the first node by two hops.

The step of displaying the selected first relevant node as the second node involving the first node may further include a step of adding an internal link between the first node and the selected first relevant node. The method may further cause the computer to execute a step of calculating a score on the internal link added between the first node and the selected first relevant node, based on the number of occurrences of the same triple, a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all the designated numbers of occurrences, and storing the calculated score as a triple.

The method may further causes the computer to execute a step of, in response to selection of the second relevant node, displaying the selected second relevant node as a third node involving the second node, and the step of displaying the selected second relevant node as the third node involving the second node further executes a step of adding an internal link between the second node and the selected second relevant node.

The computer may further execute a step of calculating a score on the internal link added between the second node and the selected second relevant node, based on the number of occurrences of the same triple, a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all the numbers of occurrences of designated {predicate}, and storing the calculated score as a triple.

The method may further causes the computer to execute a step of, in response to selection of the first node displayed in a manner of being involved in the second node, returning display of the second node to display of the first node and the first relevant node.

The method may further causes the computer to execute a step of, in response to selection of the second node displayed in a manner of being involved in the third node, returning display of the third node to display of the second node and the second relevant node.

In another embodiment of the present invention, a computer for searching for relevant nodes may include: relevant node display means for, in response to selection of a first node, displaying, as first relevant nodes, nodes having a first relevance of at least a predetermined value among nodes connected from the first node by two hops; and inclusive node display means for, in response to selection of at least one of the first relevant nodes, displaying the selected first relevant node as a second node involving the first node.

The relevant node display means may further display, as second relevant nodes, nodes having a second relevance of at least a predetermined value among nodes connected from the second node by two hops.

In response to selection of at least one of the second relevant nodes, the inclusive node display means may further display the selected second relevant node as a third node involving the second node.

The inclusive node display means may further add an internal link between the first node and the selected first relevant node.

The inclusive node display means may further renormalize the first node and the selected first relevant node to have a zero hop.

The inclusive node display means may further add an internal link between the second node and the selected second relevant node.

The inclusive node display means may further renormalize the second node and the selected second relevant node to have a zero hop.

The triple extraction means may represent the triple as {subject, predicate, object}. The triple extraction means may store the number of occurrences of the same triple as a triple.

The computer may further include statistical information calculation means for calculating each of the first relevance and the second relevance using a triple. The statistical information calculation means may calculate a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all numbers of occurrences of designated {predicate}, and store each of the calculated values as a triple.

The statistical information calculation means may further calculate a score of an edge on each of nodes connected from the first node by two hops, based on the number of occurrences of the same triple, a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all the designated numbers of occurrences of designated {predicate}, and store each calculated score as a triple.

If multiple edges exist between the first node and one node connected from the first node by two hops, the statistical information calculation means may calculate a score of all the edges based on the score of each of the edges, and store the calculated score as a triple. The calculated score is a score of one node connected from the first node by two hops.

The inclusive node display means may add an internal node between the first node and the selected first relevant node. The statistical information calculation means may further execute a step of calculating a score on the internal link added between the first node and the selected first relevant node, based on the number of occurrences of the same triple, a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all the designated numbers of occurrences of designated {predicate}, and store the calculated score as a triple.

In response to selection of the second relevant node, the inclusive node display means may further execute a step of displaying the selected second relevant node as a third node involving the second node. The inclusive node display means may further add an internal link between the second node and the selected second relevant node. The statistical information calculation means may further execute a step of calculating a score on the internal link added between the second node and the selected second relevant node, based on the number of occurrences of the same triple, a value acquired from the number of occurrences of {subject-predicate-object} in a case of changing {object} with respect to each {subject-predicate}, a value acquired from the number of occurrences of {subject-predicate-object} in a case of changing {subject} with respect to each {predicate-object} and a value acquired from all the numbers of occurrences of designated {predicate}, and store the calculated score as a triple.

In response to selection of the first node displayed in a manner of being involved in the third node, the relevant node display means may further return display of the second node to display of the first node and the first relevant node.

In response to selection of the second node displayed in a manner of being involved in the third node, the relevant node display means may further return display of the third node to display of the second node and the second relevant node.

In another embodiment of the present invention, a computer program or a computer program product for searching for relevant nodes causing a computer to execute each step of the first method is disclosed. The computer program can be stored in any of computer-readable recording media, such as one or more of a flexible disk, MO, CD-ROM, DVD, BD, hard disk device, USB-connectable memory medium, ROM, MRAM, and RAM. The computer program can be downloaded from another computer, e.g., a server, which is connected by a communication line, for being stored in the recording medium, or copied from another recording medium. The computer program according to the exemplary embodiment of the present invention may be compressed, or divided into multiple segments, and stored in a single or multiple recording media. It should be noted that it is a matter of course that computer program products according to exemplary embodiments of the present invention can be provided in various forms. The computer program product according to the exemplary embodiment of the present invention may involve, for instance, a storing medium that stores the computer program, and a transmission medium that transmits the computer program.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which not all structures may be shown.

FIG. 5A shows an example of triples {subject, predicate, object} usable in the exemplary embodiment of the present invention.

FIG. 5B shows a table having the triples shown in FIG. 5A and triples storing values calculated from the triples shown in FIG. 5A (statistical information) that are usable in the exemplary embodiment of the present invention.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art.

As will be appreciated by one skilled in the art, aspects of the present invention may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

Embodiments of the present invention provide a method of searching for a relevant node. This technique may involve the method of searching for a relevant node, a computer for searching for the relevant node, a computer program and a computer program product.

Figure 1:
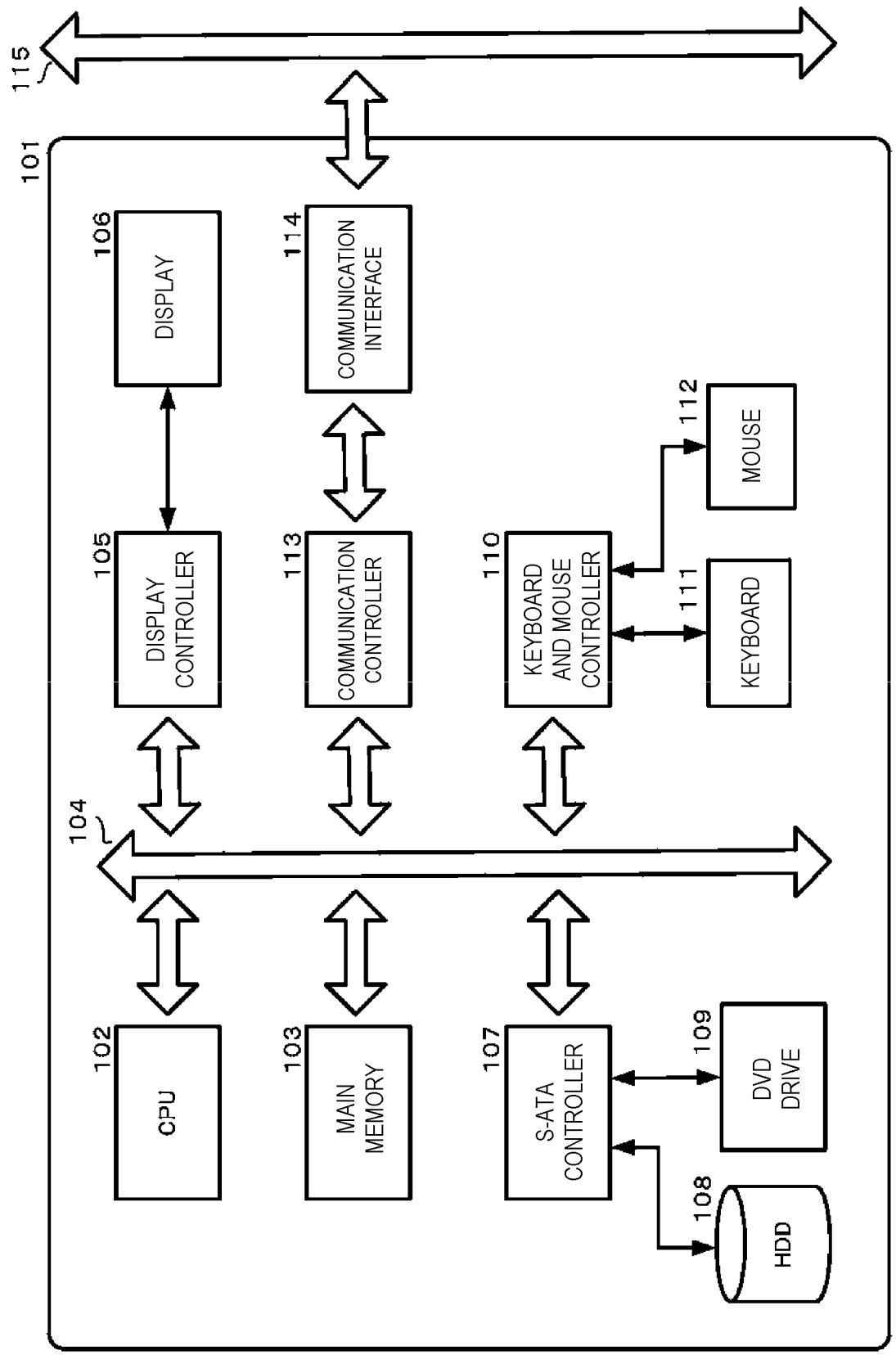
FIG. 1 is a diagram showing an example of a computer usable in an embodiment of the present invention or a computer according to an embodiment of the present invention.

FIG. 1 is a diagram showing an example of a computer usable for an embodiment of the present invention or a computer according to an embodiment of the present invention. The computer may be, for instance, a computer, e.g., a server computer, a desktop computer, a notebook computer, or an integrated personal computer. However, the computer is not limited thereto.

The computer (101) includes a CPU (102) and a main memory (103), which are connected to a bus (104). Preferably, the CPU (102) is based on a 32-bit or 64-bit architecture. A display (106), e.g., a liquid crystal display (LCD), can be connected to the bus (104) via a display controller (105). The liquid crystal display (LCD) may be, for instance, a touch panel display or a floating touch display. The display (106) may be used for displaying an object that is to be displayed by operation of software operating on the computer (101) (e.g., a computer program according to the embodiment of the present invention, or various computer programs (e.g., any of various computer programs) operating on the computer (101)) through an appropriate graphic interface. The display (106) can output, for instance, a screen of a web browser application.

A disk (108), e.g., a hard disk or a solid state drive (SSD), can be optionally connected to the bus (104) via e.g., an SATA or IDE controller (107). A drive (109), e.g., a CD, DVD or BD drive, can be optionally connected to the bus (104) via e.g., the SATA or IDE controller (107). A keyboard (111) and a mouse (112) can be optionally connected to the bus (104) via a peripheral device controller (110), e.g., a keyboard and mouse controller or a USB bus. The disk (108) may store an operating system, for instance, an operating system developed for a mainframe, a computer program according to the embodiment of the present invention, and any other various computer programs, and data, in a manner loadable to the main memory (103). The disk (108) may be embedded in the computer (101), connected via a cable in a manner allowing the computer (101) to access to this disk, or connected via a wired or wireless network in a manner allowing the computer (101) to access to this disk. The drive (109) may be used for installing a program, for instance, an operating system, an application program or a computer program according to the embodiment of the present invention, into the disk (108) from a CD-ROM, DVD-ROM or BD, as necessary.

A communication interface (114) is in conformity with, e.g., the Ethernet (R) protocol. The communication interface (114) is connected to the bus (104) via the communication controller (113), performs a role of connecting the computer (101) to a communication line (115) in a wired or wireless manner, and provides a network interface layer for the TCP/IP communication protocol of a communication function of the operating system of the computer (101). The communication line is, for instance, a wireless LAN environment in conformity with wireless LAN connection standards, a Wi-Fi wireless LAN environment, such as IEEE802.11a/b/g/n, or a mobile phone network environment (e.g., 3G or 4G environment).

Figure 2:
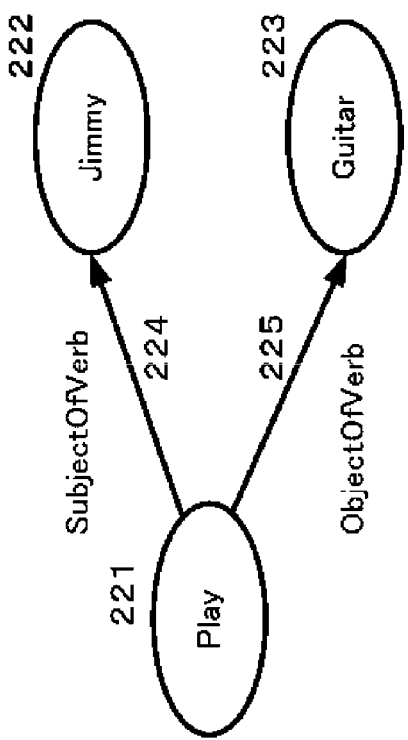
FIG. 2 is a diagram showing triples usable in the embodiment of the present invention, and a graph created from these triples.

FIG. 2 is a diagram showing triples usable in the embodiment of the present invention, and a graph created from these triples. The triple is a general form of storing data extracted from text data. The triple is, for instance, a model for metadata on the Resource Description Framework (RDF). A combination of three values is used for the triple. The triple represents relationship information on resources using three elements, e.g., a subject, a predicate and an object. The RDF is standardized by W3C (W3C: REC-rdf-syntax-19990222).

The triple may be represented using, for instance, a combination of triple={subject, predicate, object} (201). The subject is a resource of a description target. The predicate represents the characteristics of the subject, or the relationship between the subject and the object. The object is what is related to the subject, or the value of the predicate. It should be noted that the terms "subject", "predicate" and "object" used in the triple here are sometimes used in a manner different from that for the meanings of a subject, a predicate and an object in the grammar of languages. The triple may be represented in, for instance, a form of triple={Subject, SubjectOfVerb, Object} (202), or triple={Subject, ObjectOfVerb, Object} (202) (201).

Hereinafter, a case where data extracted from text data is a sentence that "Jimmy plays the Guitar."

A graph (211) shown in FIG. 2 represents a graph created using the two triples from the sentence "Jimmy plays the Guitar". The graph includes two triples, i.e., triple={"play", SubjectOfVerb, "Jimmy"} (204) and triple={"play", ObjectOfVerb, "Guitar"} (205). The graph (211) has a circled enclosure (221) that serves as starting points of arrows (224, 225). This circled enclosure (221) represents the node of {Subject}. The graph (211) has arrows (224, 225) whose starting point is the node (221). These arrows (224, 225) represent predicates. Furthermore, the graph (211) has circled enclosures (222, 223) that serve as the end points of the arrows (224, 225). These circled enclosures (222, 223) represent the nodes of {Object}.

The node (221) represents a subject {play} common to the triple={"play", SubjectOfVerb, "Jimmy"} (204) and the triple={"play", ObjectOfVerb, "Guitar"} (205).

The arrow {SubjectOfVerb} (224) represents the predicate of the triple={"play", SubjectOfVerb, "Jimmy"} (204). The arrow {ObjectOfVerb} (225) represents the predicate of the triple={"play", ObjectOfVerb, "Guitar"} (205).

The node (222) represents the predicate {Jimmy} of the triple={"play", SubjectOfVerb, "Jimmy"} (204). The node (223) represents the predicate {Guitar} of the triple={"play", ObjectOfVerb, "Guitar"} (205).

The triple is stored in a triple store. The triple store stores triples. Furthermore, the triple store is used for searching for triples.

Figure 3A:
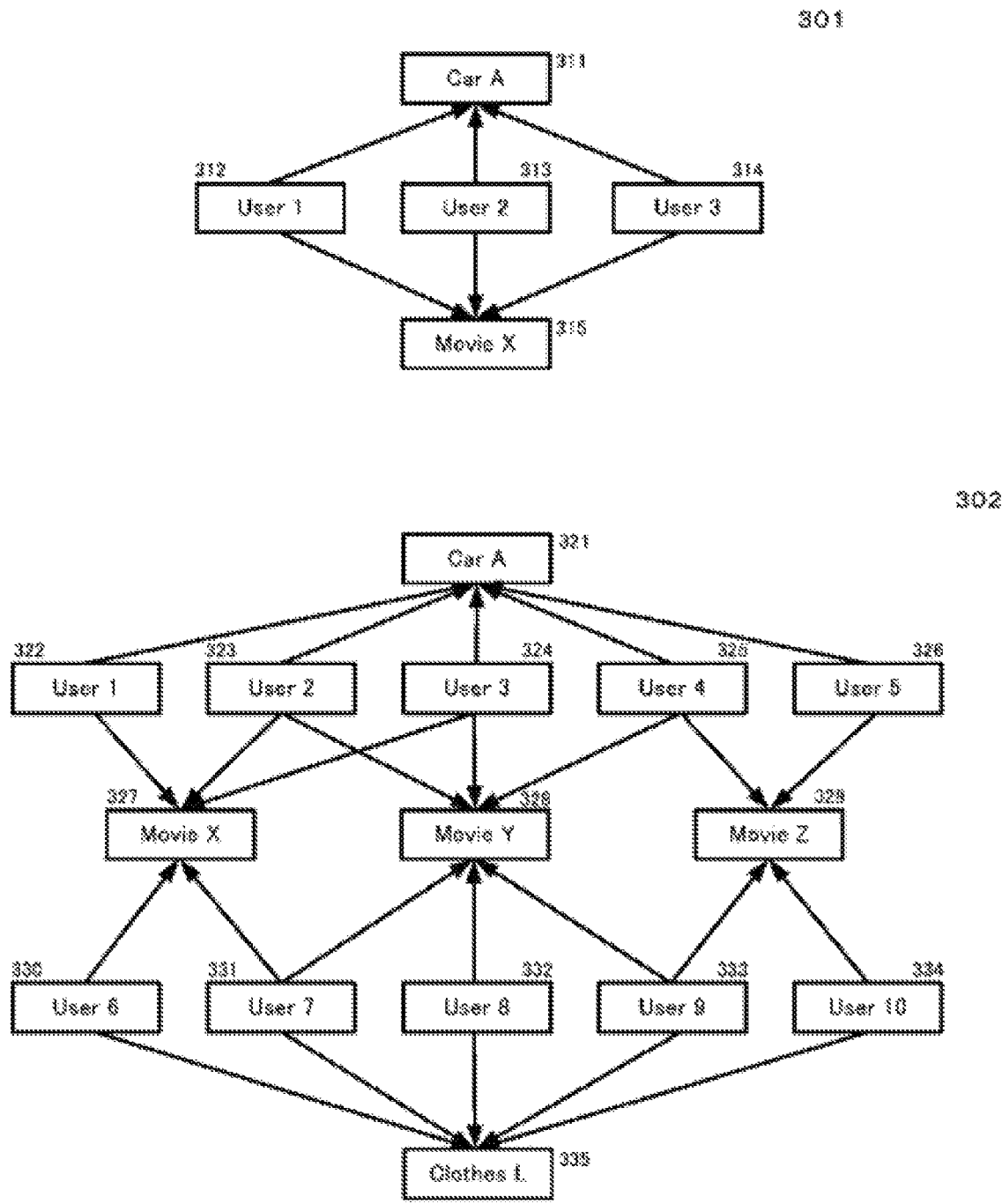
FIG. 3A shows graphs that include multiple nodes usable in the embodiment of the present invention and edges connecting the nodes, and a graph for illustrating starting nodes and nodes connected by two hops from the starting nodes.
Figure 3B:
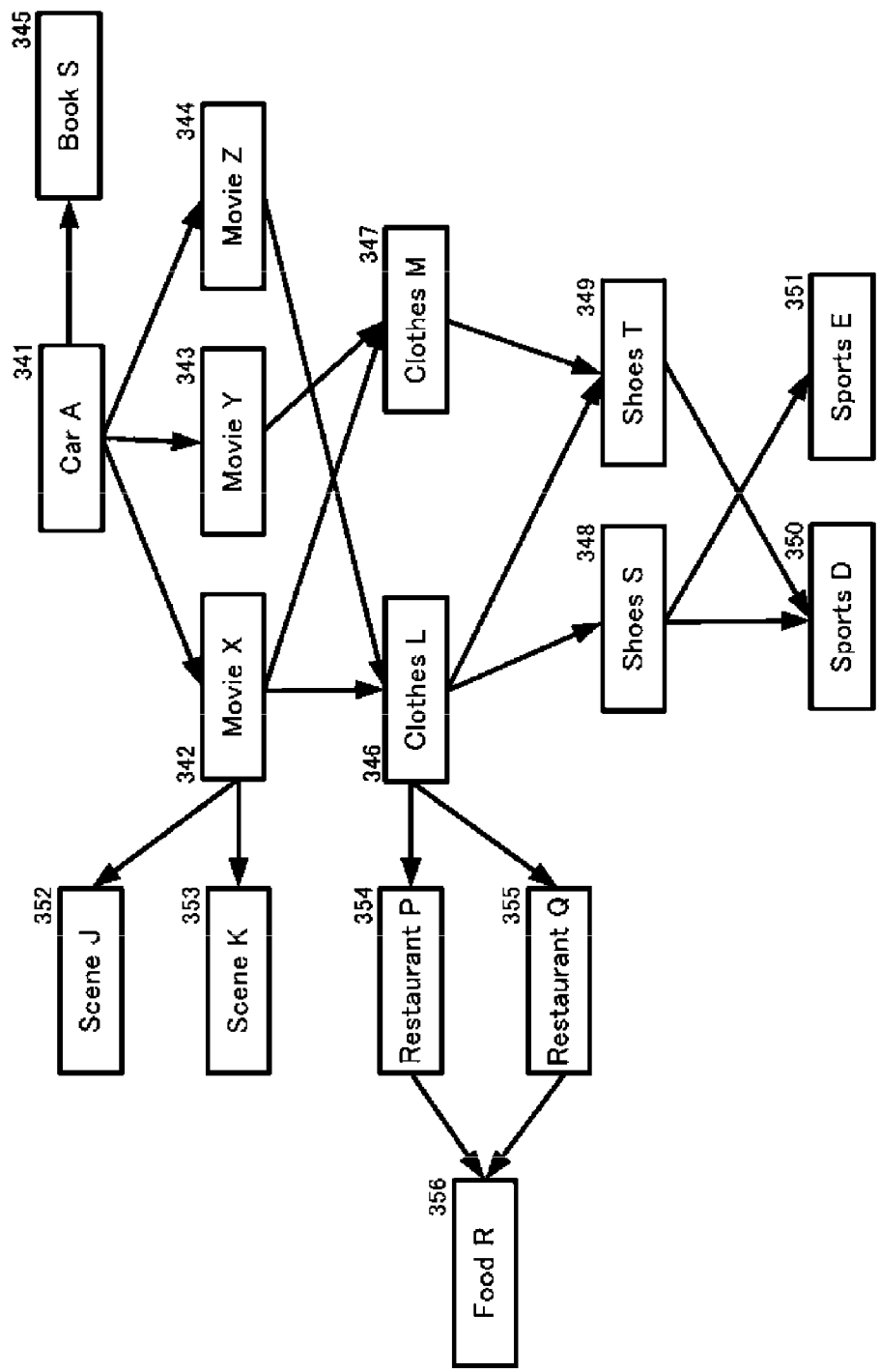
FIG. 3B shows a graph that includes multiple nodes usable in the embodiment of the present invention and edges connecting the nodes, and a graph for illustrating display where nodes connected from the starting node by two hops in the graph shown in FIG. 3A are renormalized as one-hop connected nodes.
Figure 3C:
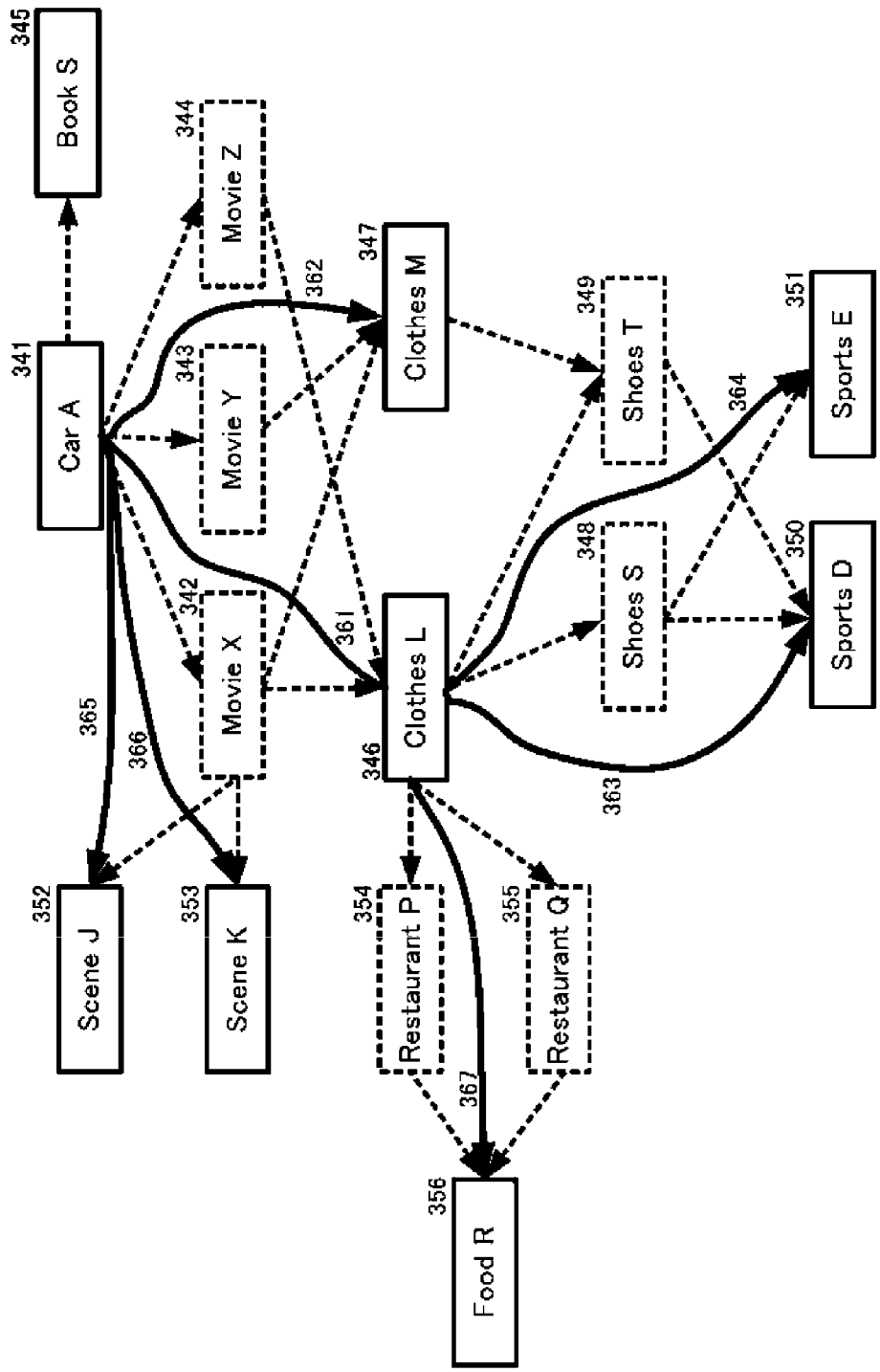
FIG. 3C shows multiple nodes usable in the embodiment of the present invention and edges connecting the nodes, and a graph for illustrating nodes connected by two hops from the starting node.

FIGS. 3A to 3C show a graph that includes multiple nodes usable in the exemplary embodiment of the present invention and edges connecting these nodes, and relevant nodes displayed as a result of search according to the exemplary embodiment of the present invention.

FIG. 3A shows graphs (301 and 302) for illustrating the starting node and nodes connected from this starting node by two hops. It is assumed that many users (312 to 314) in an SNS refer to a model A of car (311) and a movie X (315). The graph (301) represents a graph acquired by graphing, using triples, data extracted from what has been referred to by the many users (312 to 314). The graph (301) shows a basic relationship where the model A of car (311) is associated with the movie X (315) by the user 1 (312), the user 2 (313) and the user 3 (314) in the SNS. That is, statistically strong relationship between the model A of car (311) and the movie X (315) is recognized as links in the graph (301). As shown in the graph (301), the node of the model A of car (311) is connected to the node of the movie X (315) by two hops (i.e., via two edges).

It is assumed that many users (322 to 326) in the SNS refer to the model A of car (311) and the movie X (315), the model A of car (311) and a movie Y (328), and the model A of car (311) and a movie Z (329). It is also assumed that many users (330 to 334) in the SNS refer to clothes L (335) and a movie X (327), clothes L (335) and a movie Y (328), and clothes L (335) and a movie Z (329). However, in this example, the relationship between the model A of car (311) and the clothes L (335) are not directly observed in the SNS of each of the users (312 to 314 and 322 to 326).

The graph (302) represents a graph acquired by graphing, using triples, data extracted from what has been referred to by the many users (322 to 326 and 330 to 334). As with the graph (301), the graph (302) shows a basic relationship where a model A of car (321) is associated with a movie X (327) by the user 1 (322), a user 2 (323) and a user 3 (324) in the SNS and, furthermore, the model A of car (321) is associated with a movie Y (328) by the user 2 (323), the user 3 (324) and a user 4 (325) and, moreover, the model A of car (321) is associated with a movie Z (329) by the user 4 (325) and a user 5 (326) in the SNS. That is, it is recognized, as links in the graph (302), that the model A of car (321) and the movie X (327), movie Y (328) and movie Z (329) have a statistically strong relationship. The graph (302) further shows another basic relationship where the clothes L (335) are associated with the movie X (327) by a user 6 (330) and a user 7 (331) in the SNS, the clothes L (335) are associated with the movie Y (328) by the user 7 (331), a user 8 (332) and a user 9 (333) in the SNS, and the clothes L (335) are associated with the movie Z (329) by the user 9 (333) and a user 10 (334) in the SNS. That is, it is recognized, as links in the graph (302), that the clothes L (335) and the movie X (327), movie Y (328) and movie Z (329) have a statistically strong relationship.

As shown in the graph (302), the node of the model A of car (321) is connected to each of the nodes of the movie X (327), movie Y (328) and movie Z (329) by two hops. The node of the clothes L (335) is connected to each of the nodes of the movie X (327), movie Y (328) and movie Z (329) by two hops.

FIG. 3B shows a graph (303) for illustrating display where the nodes connected by two hops from the starting node (321) in the graph (302) shown in FIG. 3A, as one-hop connected nodes (i.e., display via one edge). The graph (303) shows relevant nodes displayed as a result of search for the relevant nodes according to the exemplary embodiment of the present invention. In the graph (303), description of each of nodes of users is omitted from the graph (302) shown in FIG. 3A. That is, the graph (303) displays the nodes connected by two hops as one-hop connected nodes. It is assumed that the node of the model A of car (341) is the starting node (341) in the graph (303). The graph (303) shows various nodes indirectly related to the model A of car (341), which is the starting node. That is, the graph (303) displays the nodes connected by two hops from the starting node (341), as one-hop connected nodes.

The graph (303) shows that the node of the model A of car (311) is indirectly related to each of the nodes of clothes L (346) and clothes M (347), shoes S (348) and shoes T (349), sports D (350) and sports E (351), a scene J (352) and a scene K (353), and a restaurant P (354) and a restaurant Q (355). Thus, the user can find that the model A of car (311) is related to, for instance, the sports D (350) and the sports E (351) according to the graph (303).

FIG. 3C shows an embodiment that displays nodes connected from the starting node (314) by every two hops in the graph (303) shown in FIG. 3B, and thus shows an embodiment of searching the displayed nodes for relevant nodes. As with the graph (303), the graph (304) shows relevant nodes displayed as a result of search for the relevant nodes according to the exemplary embodiment of the present invention.

In the graph (304), arrows (361, 362, 363, 364, 365, 366 and 367) shown by thick lines indicate relevant nodes (346, 347, 350, 351, 352, 353 and 356) connected from the starting node by every four hops. That is, the arrows (361, 362, 363, 364, 365, 366 and 367) shown by thick lines indicate that the nodes of the clothes L (346) and clothes M (347), the shoes S (348) and shoes T (349), the sports D (350) and sports E (351), the scene J (352) and scene K (353), and the restaurant P (354) and restaurant Q (355) are respective nodes (relevant nodes) related to the model A of car (311), which is the starting node.

As described above, search for the relevant nodes through use of the graphs (303 and 304) shown in respective FIG. 3B and FIG. 3C according to the exemplary embodiment of the present invention can clarify a relationship that does not explicitly appear from reference by many users in the SNS and a relationship that is difficult to be found by a person.

Figure 4A:
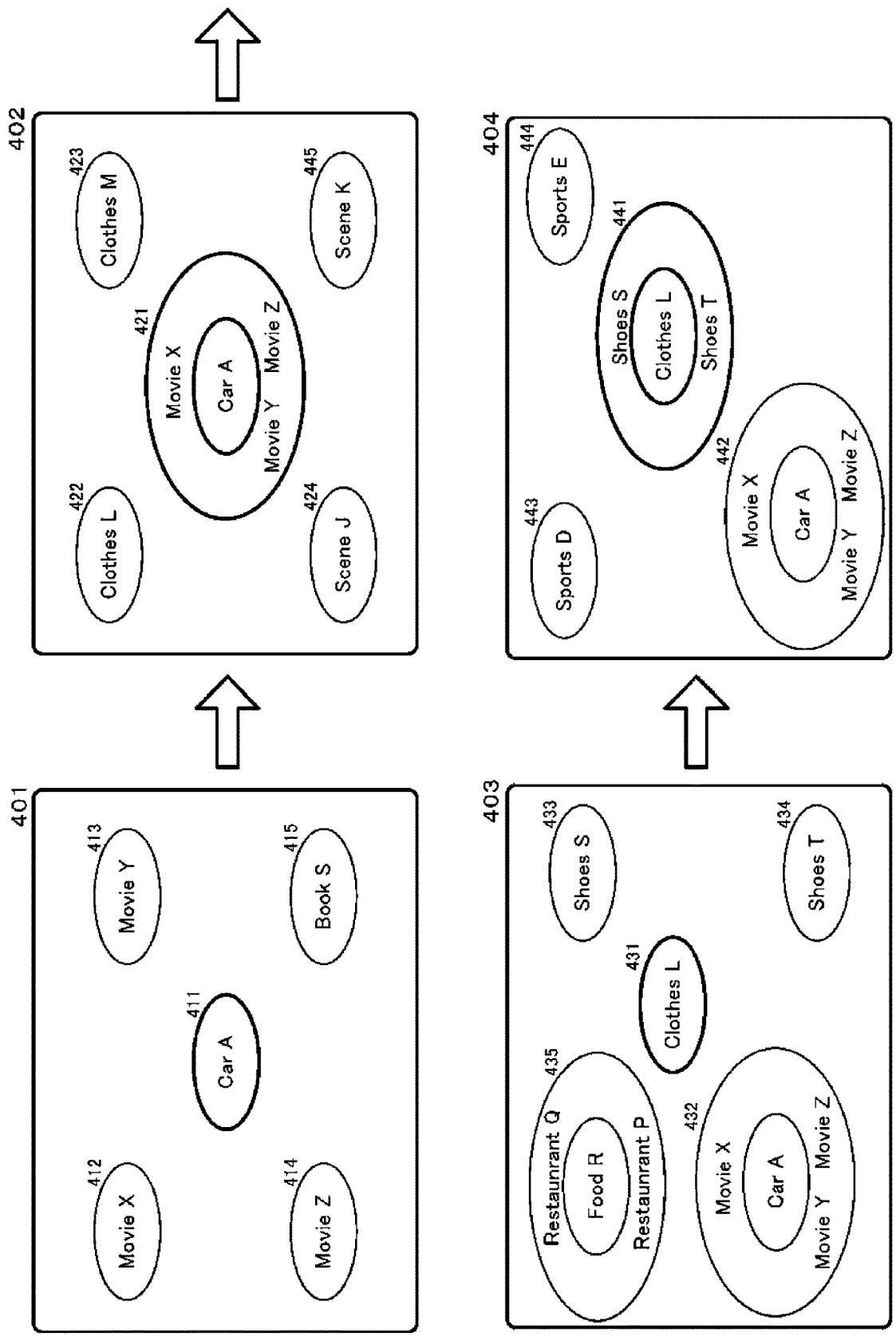
FIG. 4A is a diagram for illustrating an embodiment that displays, as first relevant nodes, nodes having a relevance of at least a predetermined value among nodes connected by two hops from the starting node on the basis of the graph shown in FIG. 3C, and that, in response to selection of at least one of the first relevant nodes and displays the selected first relevant node as a second node including the first node, and an embodiment that changes the starting node, according to the embodiment of the present invention.
Figure 4B:
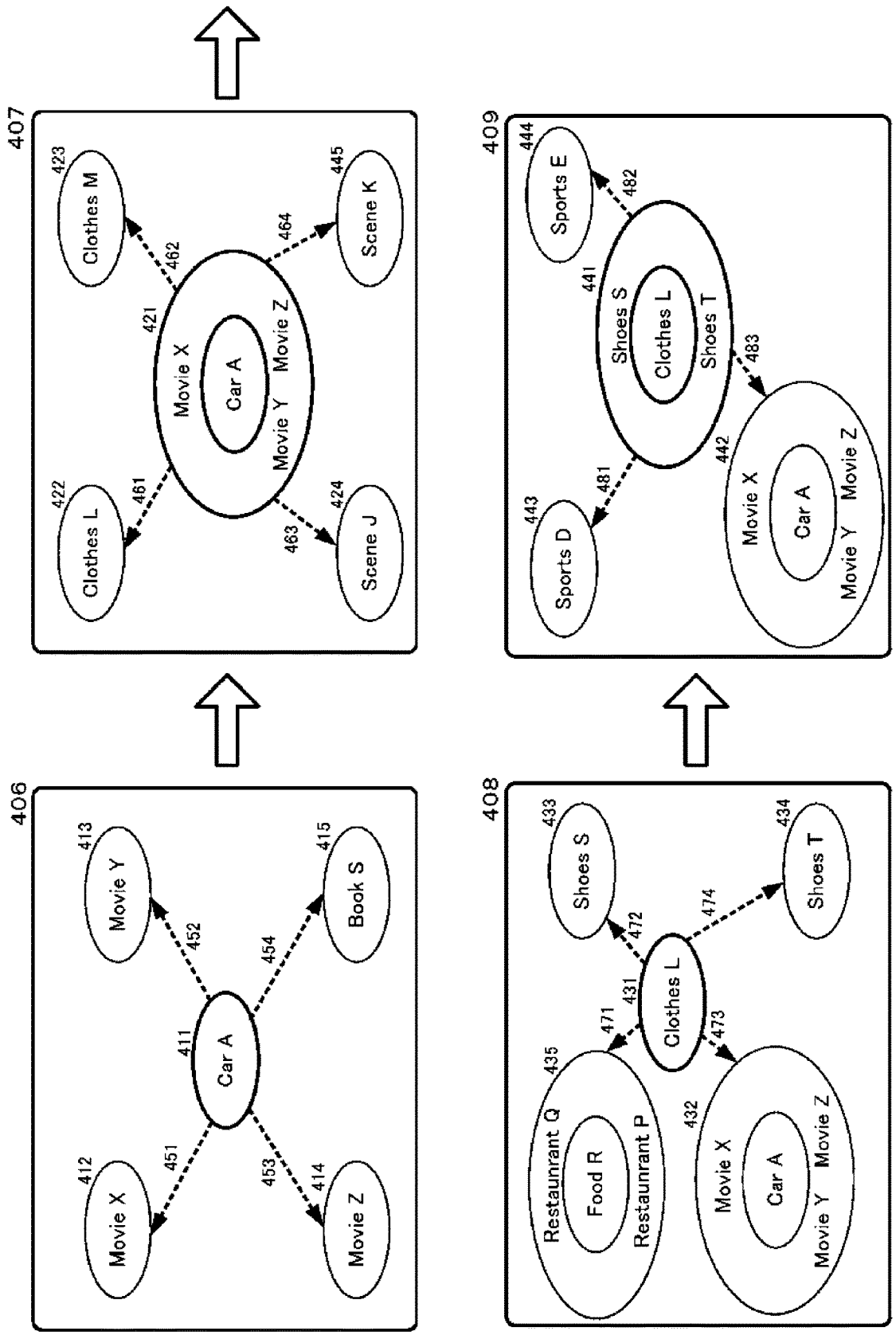
FIG. 4B is a diagram for illustrating an embodiment that displays, as first relevant nodes, nodes having a relevance of at least a predetermined value among nodes connected by two hops from the starting node on the basis of the graph shown in FIG. 3C, and that, in response to selection of at least one of the first relevant nodes and displays the selected first relevant node as a second node including the first node, and an embodiment that changes the starting node, according to the embodiment of the present invention.

Each of FIGS. 4A and 4B is a diagram for illustrating an embodiment that displays, as first relevant nodes, nodes having a relevance of at least a predetermined value among nodes connected from the starting node by two hops on the basis of the graph (304) shown in FIG. 3C and, in response to selection of at least one of the first relevant nodes, displays the selected first relevant node as a second node that includes the first node, and an embodiment that changes the starting node.

FIG. 4A shows a screen example for illustrating an embodiment where a user searches for relevant nodes from a model A of car (411), which is the starting node, and an embodiment that changes the starting node to another node. This screen may be displayed on a display device (e.g., the display (106) shown in FIG. 1) connected to a computer (e.g., the computer 101 shown in FIG. 1). In each screen show in FIG. 4A, displaying of edges that connect nodes is omitted.

A screen (401) represents that the starting node (corresponding to a "first node" described in claims) is the model A of car (411) and that relevant nodes ("first relevant nodes" described in claims) having a score, i.e., relevance (corresponding to a "first relevance" described in claims) of at least a predetermined value among nodes connectable from the model A of car (411) by two hops are a movie X (412), a movie Y (413) and a movie Z (414), and a book S (415). The model A of car (411), which is the starting node, may be displayed at the center of the screen (401). It is assumed that the user wishes to know nodes that are related to nodes related to a movie. The user selects relevant nodes related to the movie, i.e., at least one relevant node from among the movie X (412), the movie Y (413) and the movie Z (414) using, for instance, a pointing device.

In response to the selection of the one relevant node, the computer (101) selects nodes related to the selected relevant node. For instance, if the relevant node selected by the user is the node of the movie X (412), the computer (101) can automatically select relevant nodes related to movies, which belong to the same theme as the theme of this selected relevant node; i.e., in this case, the computer can select the movie Y (413) and the movie Z (414). The computer (101) creates a node (421) (hereinafter, referred to as an inclusive node (421)) (corresponding to a "second node" described in claims) that involves the node of the model A of car (411), which is the starting node, and the nodes of the movie X (412), movie Y (413) and movie Z (414). In the inclusive node (421), the node of the model A of car (411) and the nodes of the movie X (412), movie Y (413) and movie Z (414) are renormalized to have a zero hop. Thus, the renormalization of each node as zero hop allows the inclusive node to be processed as one node. In the inclusive node (421), internal links for directly linking nodes are added between the node of the model A of car (411) and the nodes of the movie X (412), the movie Y (413) and the movie Z (414). The internal links are not displayed on the screen. If the internal links are displayed on the screen, the internal links are displayed as edges in the graph. The inclusive node (421) includes the node of the model A of car (411), which is the starting node. Accordingly, the inclusive node (421) becomes the starting node.

On the screen (402), the starting node is the inclusive node (421). This screen shows that relevant nodes (corresponding to "second relevant nodes" described in claims) having a relevance (corresponding to a "second relevance" described in claims) of at least a predetermined value among the nodes connected from the inclusive node (421) by two hops are clothes L (422), clothes M (423), a scene J (424) and a scene K (445). In other words, the screen (402) displays relevant nodes connected from the node of the model A of car (411) by four hops. The inclusive node (421), which is the starting node, may be displayed at the center of the screen (402). The foregoing renormalization increases the number of nodes included in a cluster of nodes (an inclusive node in which relevant nodes are renormalized), thereby enabling the start point of the graph to transition to a macro scale. Repetition of the renormalization enables the start point of the graph to transition to the macro scale in a stepwise manner.

Next, it is assumed that the user wishes to change the starting node from the inclusive node (421) to the clothes L (422), which are a relevant node. The user selects the icon of the clothes L (422) using, for instance, the pointing device, and drags and drops the icon to, e.g., the center of the screen (402).

On the screen (403), the starting node is the clothes L (422). This screen shows that nodes having a relevance of at least the predetermined value among nodes connected from the clothes L (422) by two hops are an inclusive node (432), shoes S (433) and shoes T (434), and an inclusive node (435). The inclusive node (432) is the same as the starting node on the screen (402) where the node of the model A of car involves the nodes of the movie X, the movie Y and the movie Z. The inclusive node (433) is the node of the food R in which the nodes of the restaurant P and the restaurant Q are involved. The clothes L (422), which are the starting node, may be displayed at the center of the screen (403).

Next, it is assumed that the user wishes to know nodes that are related to nodes related to shoes. The user then selects relevant nodes related to shoes, i.e., at least one relevant node from among the shoes S (433) and the shoes T (434), using, for instance, the pointing device.

In response to selection of the one relevant node, the computer (101) selects nodes related to the selected relevant node. For instance, if the relevant node selected by the user is the node of the shoes S (433), the computer (101) can automatically select a relevant node related to shoes, which belong to the same theme as theme of this selected relevant node; i.e., in this case, the computer can select the shoes T (434). The computer (101) then creates a node (441) (hereinafter, referred to as the inclusive node (441)) that involves the node of the clothes L (431), which is the starting node, and the nodes of the shoes S (433) and the shoes T (434). In the inclusive node (441), the node of the clothes L (431) and the nodes of the shoes S (433) and the shoes T (434) are renormalized to have a zero hop. In the inclusive node (441), internal links for directly linking nodes are added between the node of the clothes L (431) and each of the nodes of the shoes S (433) and the shoes T (434). The internal links are not displayed on the screen. The inclusive node (441) includes the node of the clothes L (431), which is the starting node. Accordingly, the inclusive node (441) is the starting node.

On the screen (404), the starting node is the inclusive node (441). This screen shows that the nodes having a relevance of at least the predetermined value among nodes connected from the inclusive node (441) by two hops are sports D (443) and sports E (444), and an inclusive node (442). In other words, the screen (404) displays relevant nodes connected from the node of the clothes L (431) by four hops. The inclusive node (441), which is the starting node, may be displayed at the center of the screen (404).

Next, it is assumed that the user wishes to return to the display of the relevant nodes related to the node of the clothes L (431) in the inclusive node (441). The user then clicks the inside of the node of the clothes L (431) in the inclusive node (441) using, for instance, the pointing device.

In response to detection of the click, the computer (101) switches a screen (409) to a screen (408) shown in FIG. 4B. Thus, the start point of the graph can be returned to the micro scale. Repetition of return to the micro scale enables the start point of the graph to transition to the micro scale in a stepwise manner.

As described above, the relevant node is searched for according to the exemplary embodiment of the present invention while the node on each screen in FIG. 4A is selected, and these selection and search are optionally repeated, thereby allowing clarification of the relationship that does not explicitly appear from reference by many users in the SNS and the relationship that is difficult to be found by a person.

Combination of the transition to the macro scale by renormalization and the transition to the micro scale allows the internal links of the graph to be reconfigured, and facilitates organizing words indicated by nodes.

As with FIG. 4A, FIG. 4B shows a screen example for illustrating an embodiment where the user searches for the relevant node from the model A of car (411), which is the starting node, and an embodiment that changes the starting node to another node. The screen may be displayed on the display device (e.g., the display (106) shown in FIG. 1) connected to the computer (e.g., the computer 101 shown in FIG. 1). The screens shown in FIG. 4B display the edges that connect nodes; these screens are different in this point from the respective screens shown in FIG. 4A.

The screen (406) displays the edges (451, 452, 453 and 454) that connect the nodes; this screen is different in this point from the screen (401) shown in FIG. 4A but is the same as the screen (401) in the other points. Accordingly for description of the screen (406), the description of the screen (401) should be referred to. It is assumed that the user wishes to know nodes that are related to the nodes related to movies. The user then selects a relevant node related to movies, i.e., at least one relevant node from among the movie X (412), the movie Y (413) and the movie Z (414), or at least one edge from among edges (451, 452 and 453) from the model A of car (411) to the relevant nodes (412, 413 and 414), for instance, using the pointing device.

In response to the selection of the one relevant node, the computer (101) selects nodes related to the selected relevant node (i.e., direct selection of the relevant node). For instance, if the relevant node selected by the user is the node of the movie X (412), the computer (101) can automatically select relevant nodes related to movies, which belong to the same theme as the theme of this selected relevant node; i.e., in this case, the computer can select the movie Y (413) and the movie Z (414). Alternatively, in response to the selection of the one edge, the computer (101) selects nodes related to the relevant nodes beyond the selected edge (i.e., indirect selection of relevant nodes). For instance, if the edge selected by the user is the edge (451) to the node of the movie X (412), the computer (101) can automatically select the movie X (412) beyond the selected edge, and relevant nodes related to movies, which belong to the same theme as the theme of the movie X (412); i.e., in this case, the computer can select the movie Y (413) and the movie Z (414). The computer (101) then creates the node (421) (hereinafter, referred to as the inclusive node (421)) that involves the node of the model A of car (411), which is the starting node, and the nodes of the movie X (412), the movie Y (413) and the movie Z (414). In the inclusive node (421), the node of the model A of car (411) and the nodes of the movie X (412), the movie Y (413) and the movie Z (414) are renormalized to have a zero hop. In the inclusive node (421), internal links for directly linking nodes are added between the node of the model A of car (411) and each of the nodes of the movie X (412), the movie Y (413) and the movie Z (414). The internal links are not displayed on the screen.

The screen (407) displays the edges (461, 462, 463 and 464) that connect nodes, and is different in this point from the screen (402) shown in FIG. 4A but the same as the screen (402) in the other points. Accordingly, for description of the screen (407), the description of the screen (402) should be referred to.

Next, it is assumed that the user wishes to change the starting node from the inclusive node (421) to the clothes L (422), which are a relevant node. The user selects the icon of the clothes L (422) and drags and drops the icon at the center of the screen (402) using, for instance, the pointing device.

The screen (408) displays the edges (471, 472, 473 and 474) that connect nodes, and is different in this point from the screen (403) shown in FIG. 4A, but the same as the screen (403) in the other points. Accordingly, for description of the screen (408), the description of the screen (403) should be referred to.

Next, it is assumed that the user wishes to know nodes that are related to nodes related to shoes. The user then selects a relevant node related to shoes, i.e., at least one relevant node from among the shoes S (433) the shoes T (434), or selects at least one of the edges (472 and 474) from the node of the clothes L (431) to the relevant nodes (433 and 434), using, for instance, the pointing device.

In response to the selection of the one relevant node, the computer (101) selects a node related to the selected relevant node. For instance, if the relevant node selected by the user is the node of the shoes S (433), the computer (101) can automatically select a relevant node, which belongs to the same theme as the theme of this selected relevant node; i.e., in this case, the computer can select shoes T (434). Alternatively, in response to the selection of the edge, the computer (101) selects a node related to the relevant node beyond the selected edge. For instance, if the edge selected by the user is the edge (472) to the node of the shoes S (433), the computer (101) can automatically select the shoes S (433) that is beyond the selected edge, and a relevant node related to shoes, which belong to the same theme as the theme of the shoes S (433), the relevant node being the shoes T (434). The computer (101) then creates the node (441) (hereinafter, referred to as the inclusive node (441)) that involves the node of the clothes L (431), which is the starting node, and the nodes of the shoes S (433) and the shoes T (434). In the inclusive node (441), the node of the clothes L (431) and the nodes of the shoes S (433) and the shoes T (434) are renormalized to have a zero hop. In the inclusive node (441), internal links for directly linking nodes are added between the node of the clothes L (431) and each of the nodes of the shoes S (433) and the shoes T (434). The internal links are not displayed on the screen.

The screen (409) displays the edges (481, 482 and 483) that connect nodes, and this screen is different in this point from the screen (404) shown in FIG. 4A, but the same as the screen (404) in the other points. Accordingly, for description of the screen (409), the description of the screen (404) should be referred to.

As described above, the relevant node is searched for according to the exemplary embodiment of the present invention while the node or edge in each screen in FIG. 4B is selected, and these selection and search are optionally repeated, thereby allowing clarification of the relationship that does not explicitly appear from reference by many users in the SNS and the relationship that is difficult to be found by a person.

FIGS. 5A to 5F are diagrams for illustrating an embodiment that displays, as first relevant nodes, nodes having a relevance of at least a predetermined value among nodes connected from the starting node by two hops and, in response to selection of at least one of the first relevant nodes, displays the selected first relevant node as a second node involving the first nodes, and an embodiment of calculating the relevance.

FIG. 5A shows examples of triples {subject, predicate, object} usable in the exemplary embodiment of the present invention. The triples may be stored in any format known by those skilled in the art. It is hereinafter described that the triples are stored in a table format. However, the format for storing triples is not limited thereto.

A table (501) shows triples (501A) that are extracted from data acquired by text-analyzing a first document, which is an analysis target, and triples (501B) that store the numbers of occurrences (C; count) of the extracted triples in the first document. The triples (501A) show four triples {"COFFEE", "GO WELL WITH", "CAKE"}, {"MINERAL WATER", "GO WELL WITH", "STEAK"}, {"JUICE", "GO WELL WITH", "CAKE"} and {"JUICE", "GO WELL WITH", "STEAK"}. The triples (501B) store, as triples, the numbers of occurrences of the respective four triples (501A). For instance, the triple {"COFFEE GOES WELL WITH CAKE", "C", "2"} represents that the triple {"COFFEE", "GO WELL WITH", "CAKE"} appears two times in the first document.

The table (502) shows triples (502A) that are extracted from data acquired by text-analyzing a second document (different from the first document), which is an analysis target, and triples (502B) that store the numbers of occurrences of the respective extracted triples in the second document. The triples (502A) represent four triples {"STUDENT", "ORDER", "CAKE"}, {"STUDENT", "ORDER", "STEAK"}, {"COMPANY EMPLOYEE", "ORDER", "STEAK"} and {"COMPANY EMPLOYEE", "ORDER", "PASTA"}. The triples (502B) store, as triples, the numbers of occurrences of the respective four triples (502A). For instance, the triple {"STUDENT ORDERS CAKE", "C", "10"} represents that the triple {"STUDENT", "ORDER", "CAKE"} appears ten times in the second document.

FIG. 5B shows a table including triples that store the triples shown in FIG. 5A, and values (statistical information) calculated from the triples shown in FIG. 5A. In the table (503), triples (503C) are added to the triples (501A and 501B) shown in the table (501). The triples (501C) are calculated from the four triples (503A identical to 501A). This calculation is performed by the following five Expressions (1) to (5) for each of designated predicates (types of edges). The following abbreviations are used in the table (503): SA—the average value of the numbers of occurrences of {subject-predicate-object} for each {subject-predicate} in the case where {object} is changed; SS— the total sum of the numbers of occurrences of {subject-predicate-object} for each {subject-predicate} in the case where {object} is changed; OA—the average value of the numbers of occurrences of {subject-predicate-object} for each {predicate-object} in the case where {subject} is changed; OS— the total sum of the numbers of occurrences of {subject-predicate-object} for each {predicate-object} in the case where {subject} is changed; and T—the total sum of all the numbers of occurrences of designated {predicate}. Here, the designated {predicate} may be designated by the user in some cases or automatically designated by the computer (101) in other cases. One or more {predicate} may be designated. If multiple {predicate} are designated, the total sums of the numbers of occurrences of respective designated multiple {predicate} are calculated.

The calculation result is stored as triples, as shown in the triple (501C). In the table (504), triples (504C) are added to the triples (502A and 502B) shown in table (502). The triples (504C) are calculated from the four triples (504A identical to 502A). The calculation is performed for each of designated predicates (types of edges) according to the foregoing five Expressions (1) to (5).

Figure 5C:
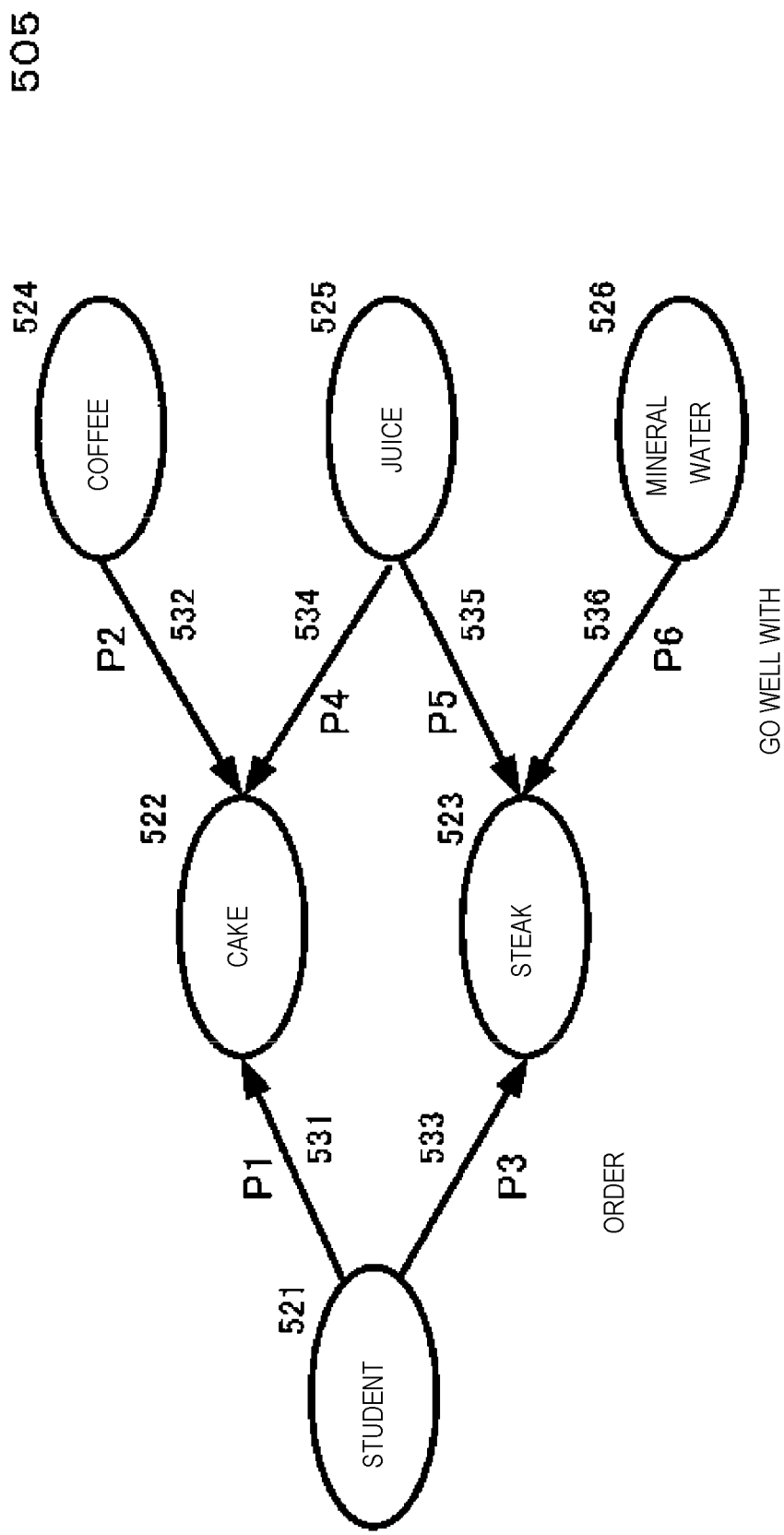
FIG. 5C is a graph including nodes and edges that are usable in the exemplary embodiment of the present invention, and for illustrating an embodiment that calculates scores from the start node to end nodes on the basis of the graph.

FIG. 5C is a graph including nodes and edges that are usable in an exemplary embodiment of the present invention, and a diagram for illustrating an embodiment of calculating scores from the start node to end nodes on the basis of the graph. The graph (505) is created on the basis of the triples shown in the table (503) and the table (504) shown in FIG. 5B.

It is hereinafter described how to create the graph (505) on the basis of the triples shown in the table (503) and the table (504) shown in FIG. 5B, and how to calculate the scores from the start node to the end nodes on the basis of the graph. It is assumed that the user designates, as the starting node, the node of a subject or an object that is to be the starting point or a subject or an object. Alternatively, it is assumed that the computer (101) designates, as the starting node, a subject or an object whose number of appearances is large. In response to the designation, the computer (101) creates the graph (505). The graph (505) shows the case where a subject designated as the starting node is {STUDENT} (521).

Next, the user designates a predicate that is to be a link. Alternatively, the computer (101) designates the predicate that is to be a link. In general, for instance, a chain of at least two predicates allows designation of a pattern of paths of links with at least two hops.

For instance, in the graph (211) in FIG. 2, it is assumed that, through SubjectOfVerb(−)-ObjectOfVerb(+), a chain of links that trace SubjectOfVerb(−) in the reverse direction and trace ObjectOfVerb(+) in the forward direction can be designated. In the graph (211) shown in FIG. 2, designation of the chain may, in turn, designate a path that connects "Jimmy" (204) to "Guitar" (205). In general, there may be multiple paths that connect "Jimmy" (204) to "Guitar" (205). For instance, presence of sentences of "Jimmy plays the Guitar" and "Jimmy breaks the Guitar" means presence of two paths that pass through "play" and "break".

The graph (505) shown in FIG. 5C represents that a predicate {GOES WELL WITH} (edges 531 and 533) and a predicate {ORDER} (edges 532, 534, 535 and 536) are designated as predicates to be edges that connect nodes. The graph (505) generated as described above includes the student (521) as the starting node, and further includes the nodes of cake (522), steak (523), coffee (524), juice (525) and mineral water (526), and edges between these nodes.

The scores (which is also the probabilities of edges) from the start node to end nodes may be calculated using triples (503B and 503C) shown in FIG. 5B and triples (504B and 504C). The correlation between the start node and an end node may be calculated by totalizing all the paths from the start node to the end nodes. The score on the path is calculated by the following expression:

$$P = (\log((C \times T)/(SA \times OA)))/OS.$$

Here, SA/T is the appearance probability of {subject-predicate}, and OA/T is the appearance probability {predicate-object}. Thus, $$T \times (SA/T) \times (OA/T) = (SA \times OA)/T$$

is the appearance expected value of a particular {subject-predicate-object}. Accordingly, $(C \times T)/(SA \times OA)$ represents a deviation from the appearance expected value. Furthermore, through achievement of $(\log((C \times T)/(SA \times OA)))/OS$, correction of Tf-Idf is applied to $(C \times T)/(SA \times OA)$.

Alternatively, any other correction known to those skilled in the art may be applied to $(C \times T)/(SA \times OA)$.

Thus, adverse effects of popular {object} can be suppressed.

In the graph (505), for instance, the score P1 on the edge 531 and the score P2 on the edge 532 are acquired as described below.

Calculation of the score P1:
C=10, T=27, SA=6, OA=10, OS=10;

$P1=(\log((C \times T)/(SA \times OA)))/OS=(\log((27 \times 10)/(6 \times 10)))/10=0.15$ Calculation of the score P2:
C=2, T=23, SA=2, OA=6, OS=12;

$P2=(\log((C \times T)/(SA \times OA)))/OS=(\log((2 \times 23)/(2 \times 6)))/12=0.11$ Other scores, or the score P3 on the edge 533, the score P4 on the edge 534, the score P5 on the edge 535, and the score on the edge 536, are also calculated as described above. In the graph (505), for instance, a score S from the student (521) to the coffee (524) is calculated as follows:

$S=P1 \times P2=0.15 \times 0.11=0.0165$

In FIG. 5C, for instance, the score S from the student (521) to the juice (525) where multiple paths exist is calculated by the following expression:

$S=P1 \times P4+P3 \times P5$

The computer (101) calculates the score from a certain node to another node as described above. Nodes having a totalized score of at least a predetermined value (the foregoing other node) is extracted as a relevant node that has a high relevance to the certain node.

If nodes having a relevance at least the predetermined value among nodes connected by two hops from the student (521), which is the starting node, i.e., the coffee (524), the juice (525) and the mineral water (526) are, for instance, the coffee (524) and the juice (525), these coffee (524) and juice (525) are extracted as the relevant nodes.

Figure 5D:
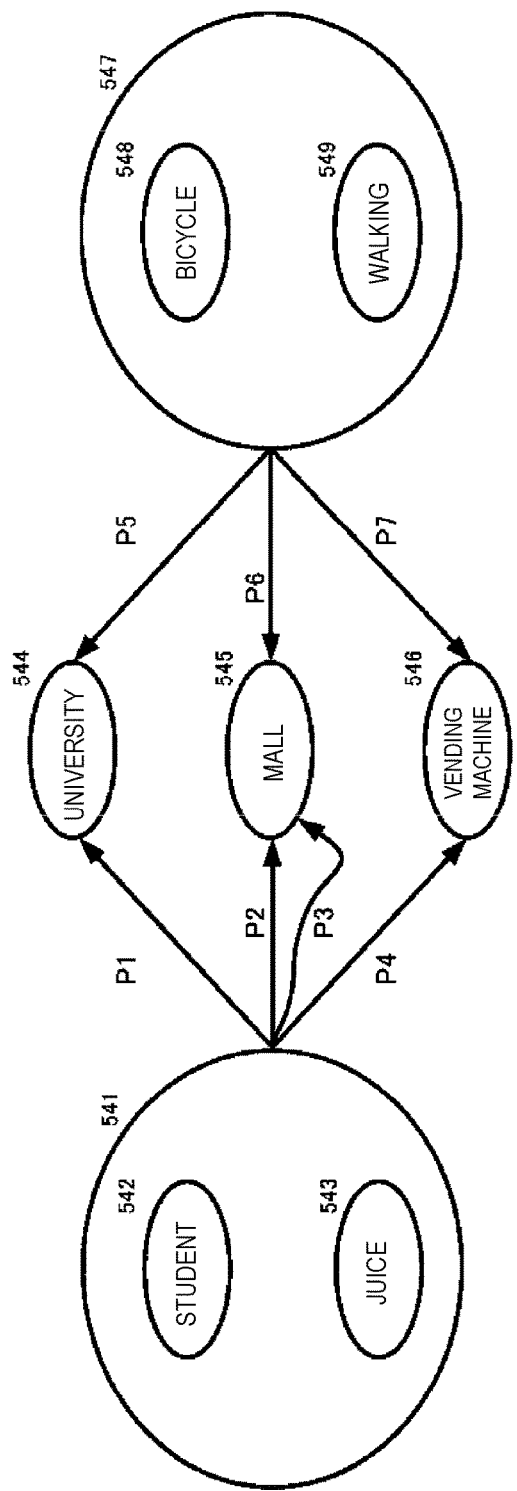
FIG. 5D is a graph including nodes (including inclusive nodes) and edges that are usable in the exemplary embodiment of the present invention, and for illustrating an embodiment that calculates scores from the start node to end nodes on the basis of the graph.

FIG. 5D is a graph including nodes (including inclusive nodes) and edges that are usable in the exemplary embodiment of the present invention, and for illustrating an embodiment that calculates scores from the start node to end nodes on the basis of the graph. A graph (506) is created on the basis of triples shown in a table (507) and a table (508). The graph (506) includes an inclusive node (541) and an inclusive node (547), and the nodes of a university (544), a mall (545) and a vending machine (546), and edges between these nodes. In the graph (506), for instance, the score S from the inclusive node (541) (student (521)+juice (543)) to the inclusive node (547) (bicycle (548)+walking (549)) is calculated as follows:

$S=P1 \times P5+P2 \times P6+P3 \times P6+P4 \times P7$

Figure 5E:
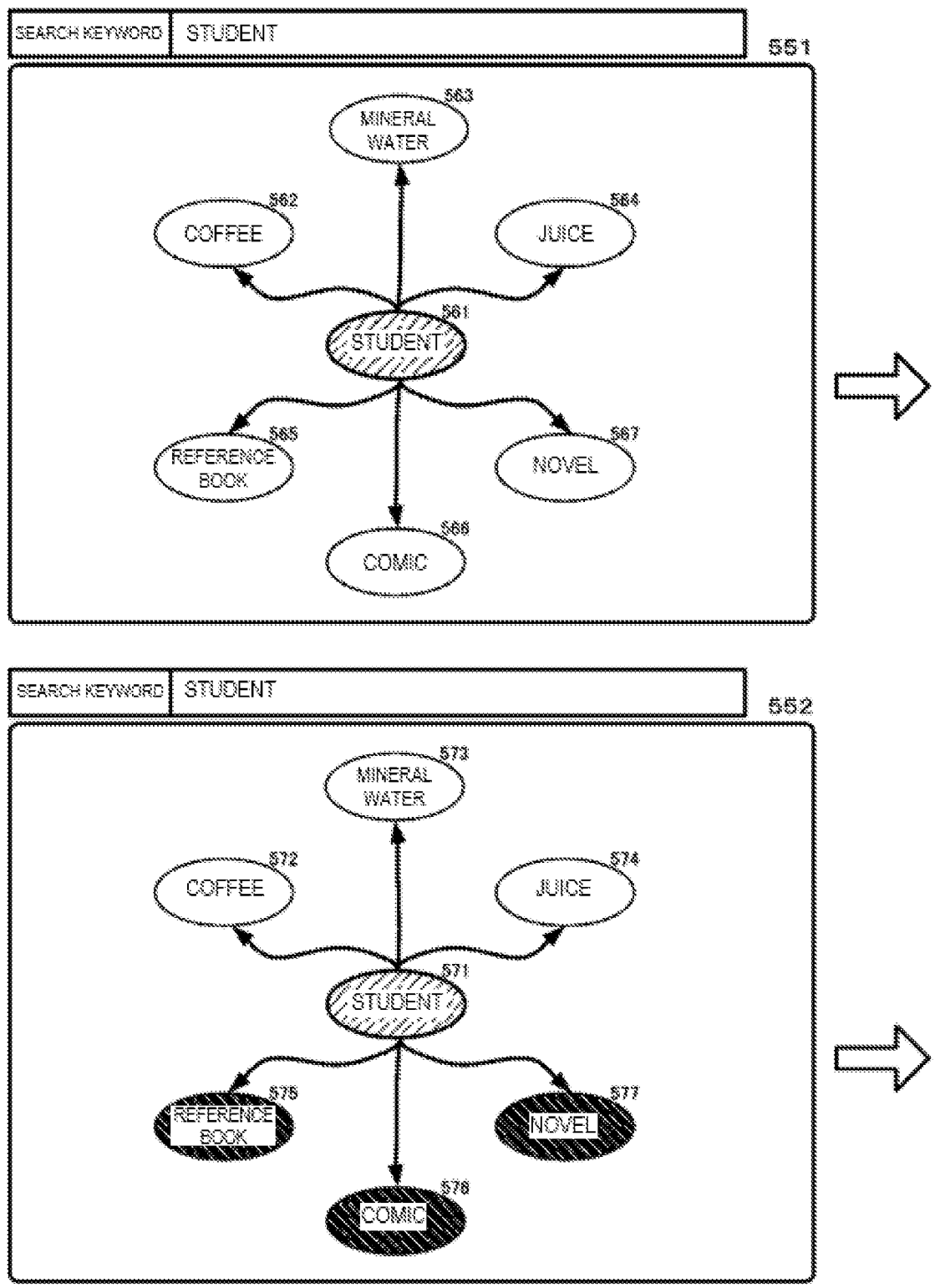
FIG. 5E is examples of screens on which nodes connected from the starting node by two hops according to the exemplary embodiment of the present invention and which shows an embodiment of selecting one node from among the displayed nodes.
Figure 5F:
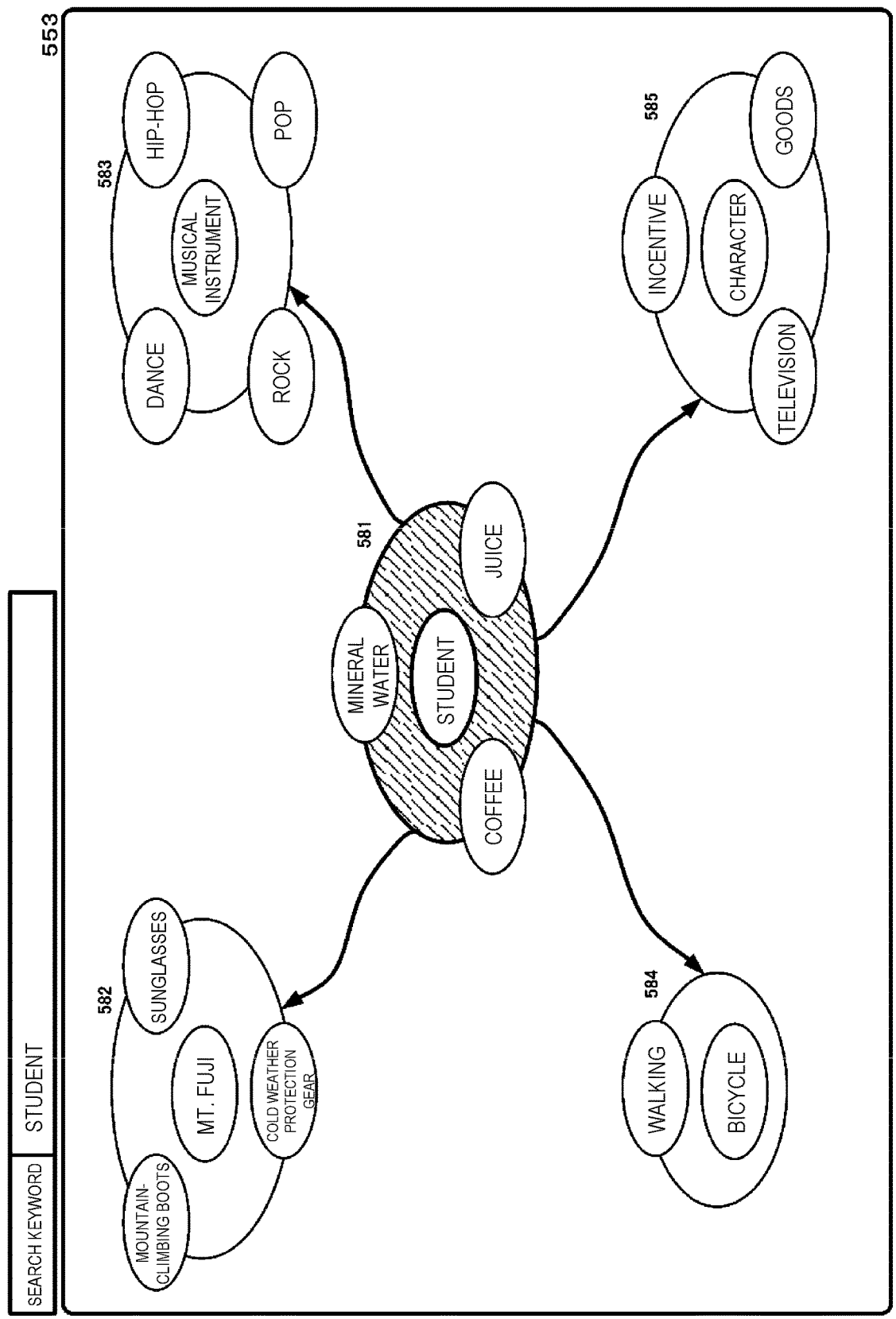
FIG. 5F is an example of screens of an embodiment that displays inclusive nodes connected by two hops from an inclusive node according to the exemplary embodiment of the present invention.

FIGS. 5E and 5F are screen examples showing an embodiment that displays nodes connected from the starting point by two hops and selects one node of the displayed nodes, and an embodiment that displays inclusive nodes connected from an inclusive node by two hops, according to the exemplary embodiment of the present invention. A screen (551) shown in FIG. 5E is a screen displayed after the user inputs a search keyword "STUDENT". The computer (101) creates a graph where the search keyword "STUDENT" input by the user is the starting node, and displays the graph on the screen. A part of the graph is created on the basis of triples shown in FIGS. 5A and 5B.

The screen (551) displays the node of a student (561), which is the starting node, and relevant nodes having a relevance of at least a predetermined value, i.e., the nodes of coffee (562), mineral water (563), juice (564), a reference book (565), a comic (566) and a novel (567), among nodes connected from the starting node by two hops, and edges from the starting node to the nodes. It is assumed that the user selects an edge that connects the node of juice (564) or the node of the student (561) to the node of juice (564) using, for instance, the pointing device.

In response to selection of the node of juice (564), the computer (101) groups nodes related to the selected node, i.e., the nodes of coffee (562) and mineral water (563) and the node of juice (564). The node related to the selected node may be a word having a high correlation with the selected node, or, if the word of the selected node is, e.g., a noun, the node related to the selected node may be another noun that uses the predicate (verb) for the foregoing noun. For instance, if the word of the selected node is "Guitar", the nodes may be other nouns, or "Organ", "Violin" and "Moog" that use the predicate "play" of the foregoing noun. Alternatively, in response to selection of the edge that connects the node of the student (561) to the node of juice (564), the computer (101) groups nodes related to the node of juice (564) that is beyond the selected edge, i.e., the nodes of coffee (562) and mineral water (563) and the node of juice (564).

A screen (552) shown in FIG. 5E is a screen after the grouping. Nodes (575, 576 and 577) having not been grouped may be shaded to be distinguished from the grouped nodes (572, 573 and 574), for instance. A screen (553) shown in FIG. 5F shows a graph that contains the grouped nodes including an inclusive node (581) that involves the student (561), which is the starting node. The graph includes relevant nodes (582, 583, 584 and 585) that are inclusive nodes having a relevance of at least the predetermined value among nodes connected from the inclusive node (581) by two hops.

FIGS. 6A to 6D show examples of flowcharts for a process of searching for a relevant node according to the exemplary embodiment of the present invention and, in particular, shows examples of flowchart for a process of inputting an analysis target document, and a process for operations of analyzing and displaying nodes. In the following description of the flowcharts, the computer (101) is described as a subject for each step. However, a computer that executes the process of inputting the analysis target document and a computer that executes the process for operations of analyzing and displaying nodes may be the same or different. Each of the process of inputting the analysis target document and the process for operations of analyzing and displaying nodes may be separately executed on one or more computers.

Figure 6A:
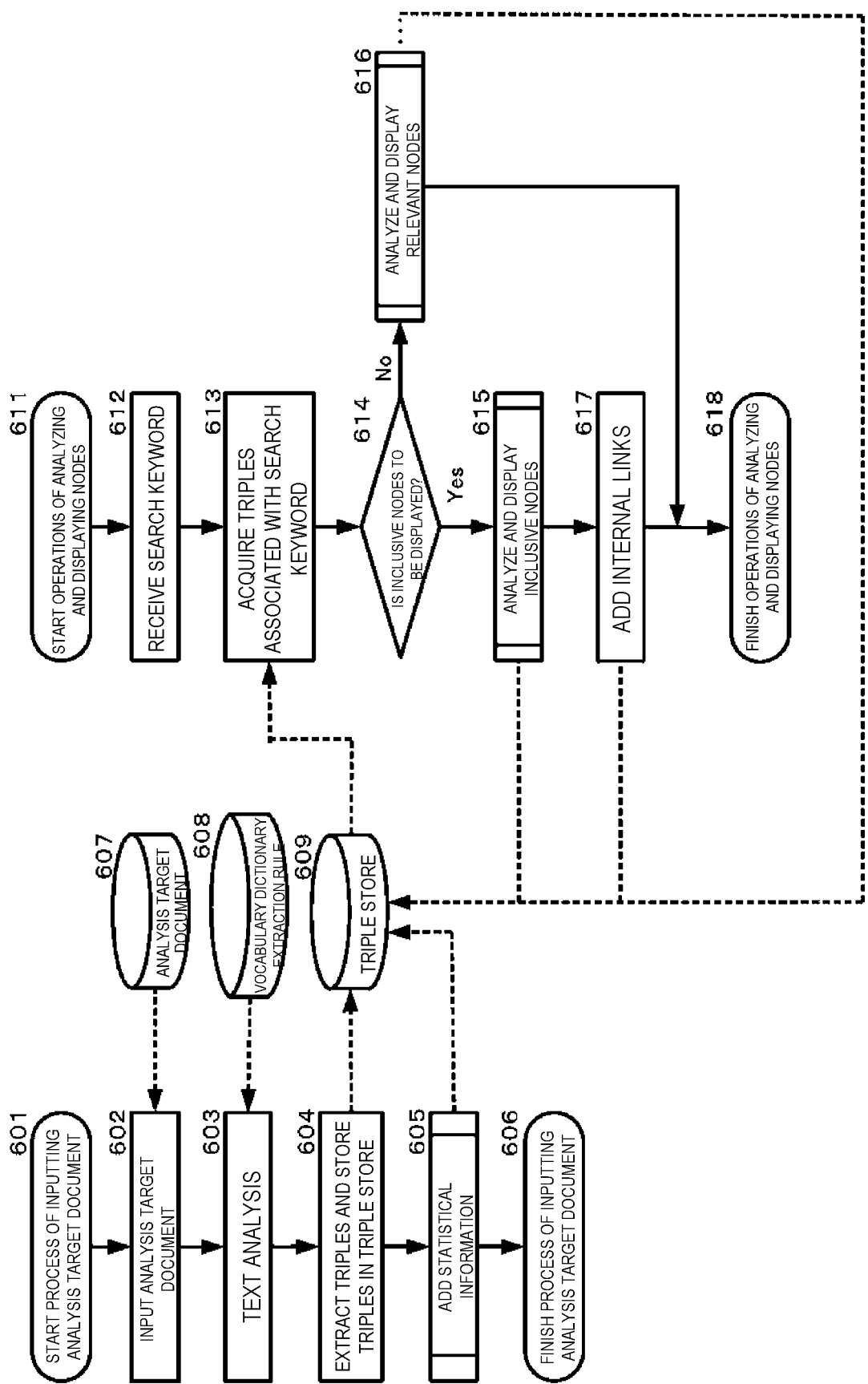
FIG. 6A is an example of a flowchart for a process of searching for relevant nodes according to the exemplary embodiment of the present invention and, in particular, shows a flowchart for an input process of an analysis target and a flowchart for processing operations of analyzing and displaying nodes.

FIG. 6A is a flowchart for the process of inputting the analysis target document, and a flowchart for the process for operations of analyzing and displaying nodes. In step 601, the computer (101) starts the process of inputting the analysis target document. The analysis target document may be, for instance, text data, or text data converted from audio data. In step 602, the computer (101) reads the analysis target document from a storing device or a storing medium (607) that stores the analysis target document. In step 603, the computer (101) text-analyzes the read analysis target document using a vocabulary dictionary extraction rule (608) and a method known to those skilled in the art. The computer (101) acquires data, e.g., metadata, through the text analysis. In step 604, the computer (101) receives data acquired in step 603, and extracts triples from the data. Without execution of steps 602 and 603, the computer (101) may receive the data acquired by another computer text-analyzing the analysis target document, from this other computer or a storing medium that stores the analyzed data. The computer (101) may store the extracted triples in a triple store (609), for instance. The triple store may be, for instance, an RDF store. Pieces of data stored in the triple store are linked to each other, and can hold topology information as a graph. In step 605, the computer (101) acquires the number of occurrences (C) of the same triple in the analysis target document from the triple extracted in step 604. The computer (101) may store the acquired number of occurrences as triples in the triple store (609), for instance.

The computer (101) calculates statistical information from the triples extracted in step 604 and the triples of the number of occurrences. The computer (101) may calculate, as statistical information, (1) a value acquired from the number of occurrences of {subject-predicate-object} in the case where the {object} is changed with reference to each {subject-predicate}; (2) a value acquired from the number of occurrences of {subject-predicate-object} in the case of changing {subject} with reference to each {predicate-object}; and (3) a value acquired from all the designated numbers of occurrences. The statistical information may be, for instance, the aforementioned (1) SA, (2) SS, (3) OA, (4) OS, and (5) T. The computer (101) may store the calculated statistical information as triples in the triple store (609), for instance. The details of the process in step 605 will be described in the FIG. 6B.

In step 606, the computer (101) finishes the process of inputting the analysis target document. In step 611, the computer (101) starts the operations of analyzing and displaying nodes. In step 612, the computer (101) receives the search keyword input by the user. The computer optionally receives a predicate designated by the user. The user can input the search keyword by direct input into a field for input of the search keyword or by selecting the search keyword from a search keyword list. The search keyword is not necessarily one word, and may include multiple words. In step 613, the computer (101) acquires triples associated with the search keyword from the triple store (609). In step 614, the computer (101) determines whether to display inclusive nodes or not. In response to displaying the inclusive node, the computer (101) advances the processing to step 615. On the contrary, in response to not displaying inclusive nodes, the computer (101) advances the processing to step 616. In step 615, the computer (101) displays a graph that includes inclusive nodes. The details of the process in step 615 will be described in the description with reference to FIG. 6C. In step 616, the computer (101) displays a graph that includes relevant nodes. The details of the process in step 616 will be described in the description with reference to FIG. 6C. In step 617, the computer (101) may add internal links between nodes included in the inclusive node. The internal links are not necessarily displayed on the graph. The computer (101) may store the added internal links as triples in the triple store (609), for instance.

The computer (101) may recalculate statistical information on the graph to which the internal links have been added. The computer (101) may store the calculated statistical information as triples in the triple store (609), for instance. Furthermore, the computer (101) may renormalize the multiple nodes included in the inclusive nodes to have a zero hop.

In step 618, the computer (101) finishes the operations of analyzing and displaying nodes.

Figure 6B:
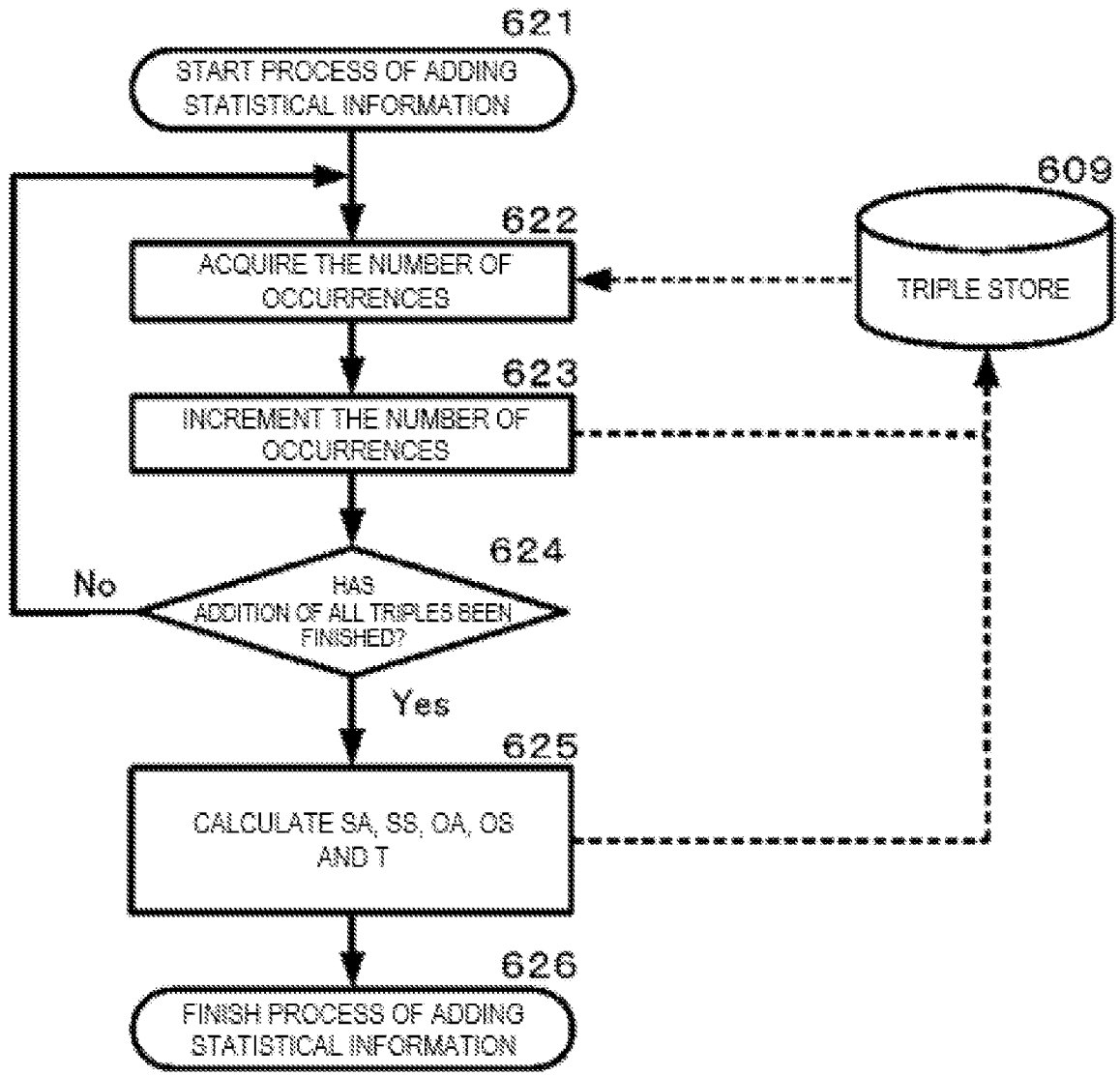
FIG. 6B shows an example of a flowchart of a process of adding statistical information in the flowchart for the process of inputting the analysis target document.

FIG. 6B shows an example of a flowchart of a process of adding statistical information in the flowchart for the process of inputting the analysis target document. In step 621, the computer (101) starts the process of adding statistical information. In step 622, the computer (101) takes out triples from the triple store (609), and acquires the number of occurrences (C) of the same triple in the analysis target document. In step 623, if the newly input triple is the same as the triple from the triple store (609), the computer (101) increments by one the number of occurrences. The computer (101) may store the triple updated to have the incremented number of occurrences, in the triple store (609). In step 624, the computer (101) determines whether the process in step 623 has been finished for all the newly input triples or not. In response to presence of unprocessed triples, the computer (101) returns the processing to step 622, and repeats the processes in steps 622 to 624. On the contrary, in response to absence of unprocessed triples, the computer (101) advances the processes to step 625. In step 625, the computer (101) calculates the statistical information, e.g., (1) SA, (2) SS, (3) OA, (4) OS, and (5) T. The computer (101) stores the calculated statistical information as triples in the triple store (609). In step 626, the computer (101) finishes the process of adding statistical information.

Figure 6C:
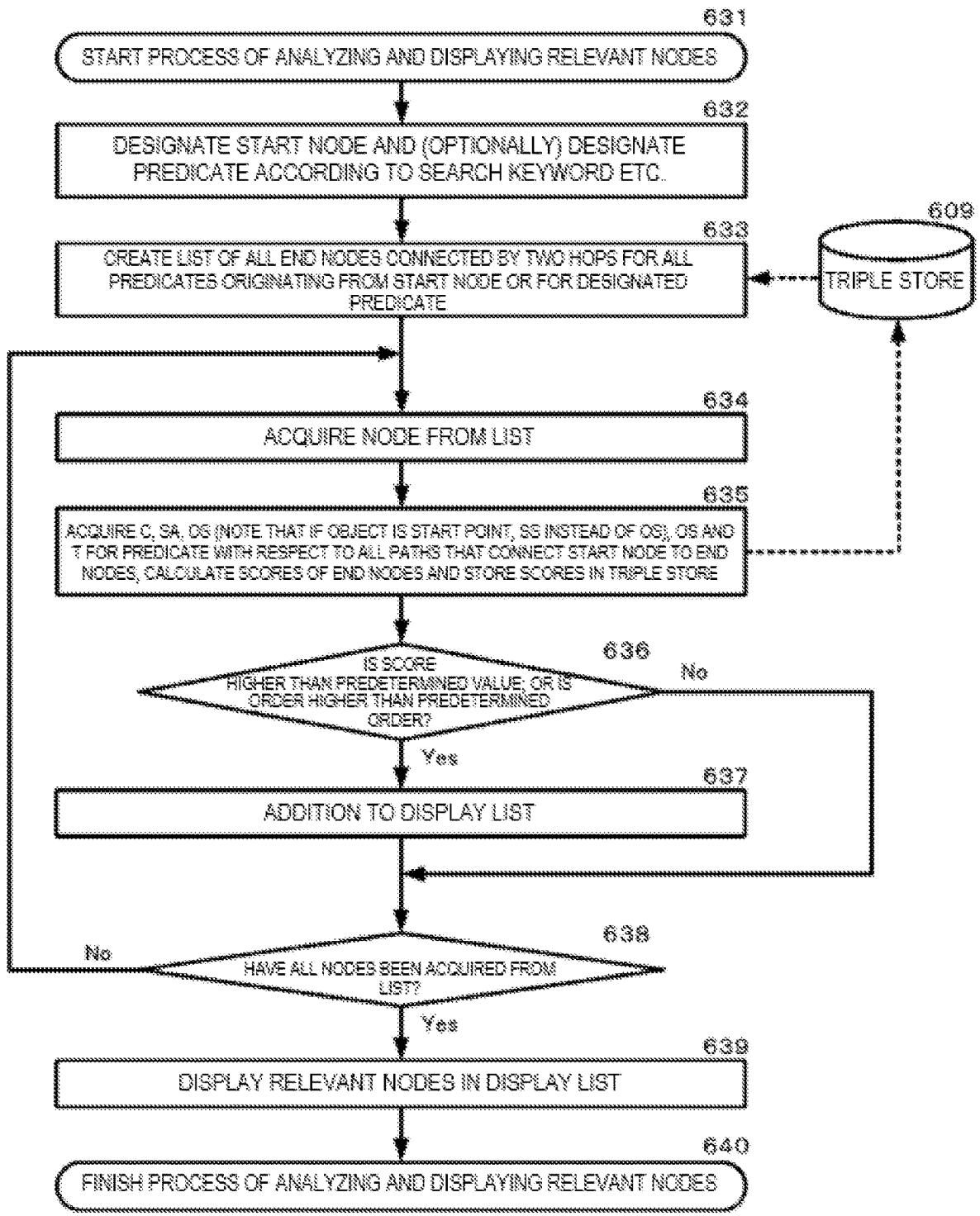
FIG. 6C shows an example of a flowchart for a process of displaying the relevant nodes in the flowchart for a process for operations of analyzing and displaying nodes.

FIG. 6C shows an example of a flowchart for a process of displaying the relevant nodes in the flowchart for the process for operations of analyzing and displaying nodes. In step 631, the computer (101) starts a process of analyzing and displaying relevant nodes. In step 632, the computer (101) designates the start node according to the search keyword received in step 612 in FIG. 6A and the like. The start node designated by the search keyword is also the starting node in the graph. Alternatively, the computer (101) displays a macro overview diagram of the entire network, and the user points out a specific place in the displayed macro overview diagram, thereby allowing the start node to be designated according to the keyword associated with a pointed portion and the like. Furthermore, the computer (101) optionally designates the predicate according to the predicate received in step 612. In step 633, the computer (101) refers to the triple store (609), and creates a list of all the end nodes connected by two hops, for all the predicates that originate from the start node, or for the designated predicate. In step 634, the computer (101) acquires a node from the list created in step 633.

In step 635, the computer (101) acquires C, SA, OS (note that if an object is the start point, SS instead of OS), OS and T for the predicate, from the triple store (609), with respect to all the paths that connect the start node to the end nodes. The computer (101) calculates the scores of the end nodes using the acquired C, SA, OS (note that if the object is the start point, SS instead of OS), OS and T for the predicate. The computer (101) then stores the calculated scores as triples in the triple store (609).

In step 636, the computer (101) determines whether the score (i.e., relevance) calculated in step 635 is at least the predetermined value or not. It can be determined whether the score is at least the predetermined value or not, according to whether the score is larger than the predetermined value or not or whether if the target relevant nodes are arranged in the order of the score, the order is higher than a predetermined order (e.g., the fifth order from the highest) or not, for instance. In response to the score having at least the predetermined value, the computer (101) advances the processing to step 637. On the contrary, in response to score being equal to or less than the predetermined value, the computer (101) advances the processing to step 638. In step 637, the computer (101) adds nodes that have the score (i.e., relevance) calculated in step 635 of at least the predetermined value, to a display list for displaying relevant nodes.

In step 638, the computer (101) determines whether all the nodes have been acquired from the list created in step 633 or not. In response to all the nodes having been acquired, the computer (101) advances the processing to step 639. On the contrary, in response to not all the nodes having been acquired, the computer (101) returns the processing to step 634 and repeats the processes in steps 634 to 638. If the processes in steps 634 to 638 are repeated, the predetermined value of the relevance in step 636 may be the same value for all repetitions, or different values for respective repetitions. In step 639, the computer (101) displays the relevant nodes in the display list together with the starting node. In step 640, the computer (101) finishes the process of analyzing and displaying relevant nodes.

Figure 6D:
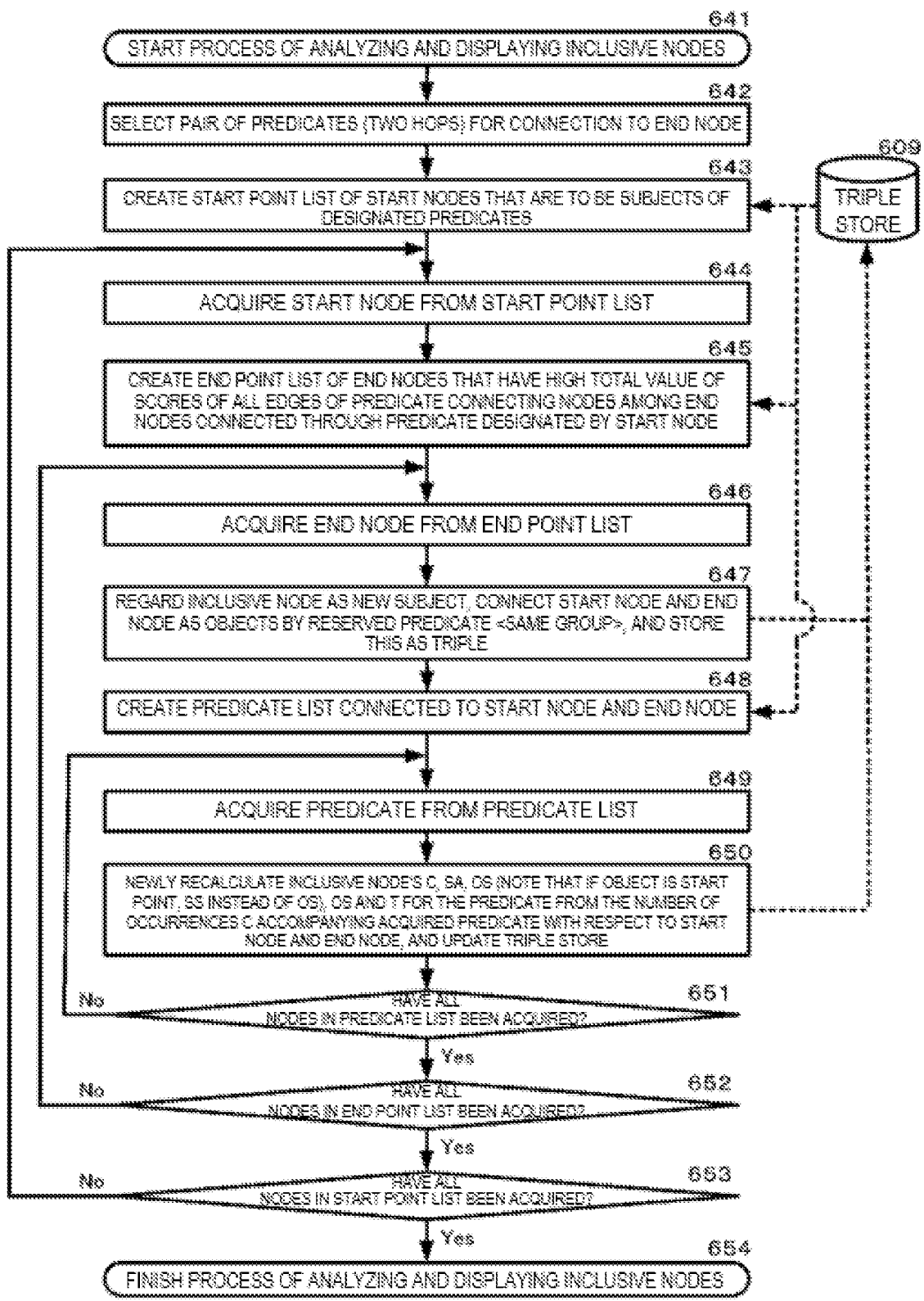
FIG. 6D is an example of a flowchart for a process of displaying the inclusive nodes in the flowchart for the process for operations of analyzing and displaying nodes.

FIG. 6D is an example of a flowchart for a process of displaying the inclusive nodes in the flowchart for the process for operations of analyzing and displaying nodes. In step 641, the computer (101) starts the process of analyzing and displaying inclusive nodes. In step 642, the computer (101) selects a pair of predicates (two hops) for connection to an end node. In step 643, the computer (101) refers to the triple store (609), and creates a start point list of the start nodes that are to be the subjects of the predicates received in step 612. In step 644, the computer (101) acquires the start node from the start point list created in step 643. In step 645, the computer (101) refers to the triple store (609), and creates an end point list of end nodes that have a high total value of the scores of all the edges of the predicate connecting the nodes among end nodes connected through the predicate designated by the start node received in step 612. In step 646, the computer (101) acquires the end node from the end point list created in step 645.

In step 647, the computer (101) regards the inclusive node as a new subject, connects the start node and the end node as objects by a reserved predicate <same group>, and stores, as a triple, the connection in the triple store (609), for instance. In step 648, the computer (101) refers to the triple store (609), and creates a predicate list connected to the start node and the end node. In step 649, the computer (101) acquires a predicate from the predicate list created in step 648. In step 650, the computer (101) newly recalculates the statistical information of the inclusive node, e.g., C, SA, OS (note that if the object is the start point, SS instead of OS), OS and T for the predicate from the number of occurrences C accompanying the predicate acquired in step 649 with respect to the start node and the end node, and updates the triple store (609).

In step 651, the computer (101) determines whether to have already acquired all the nodes in the predicate list or not. In response to all the nodes in the predicate list having already been acquired, the computer (101) advances the processing to step 652. On the contrary, in response to not all the nodes in the predicate list having been acquired, the computer (101) returns the processing to step 649, and repeats the processes in steps 649 to 651. In step 652, the computer (101) determines whether to have already acquired all the nodes in the end point list or not. In response to all the nodes in the end point list having already been acquired, the computer (101) advances the processing to step 653. On the contrary, in response to not all the nodes in the end point list having been acquired, the computer (101) returns the processing to step 646, and repeats the processes in steps 646 to 652.

In step 653, the computer (101) determines whether to have already acquired all the nodes in the start point list or not. In response to all the nodes in the start point list having already been acquired, the computer (101) advances the processing to final step 654. On the contrary, in response to not all the nodes in the start point list having been acquired, the computer (101) returns the process to step 644, and repeats the processes in steps 644 to 653. In step 654, the computer (101) finishes the process of analyzing and displaying inclusive nodes.

Figure 7:
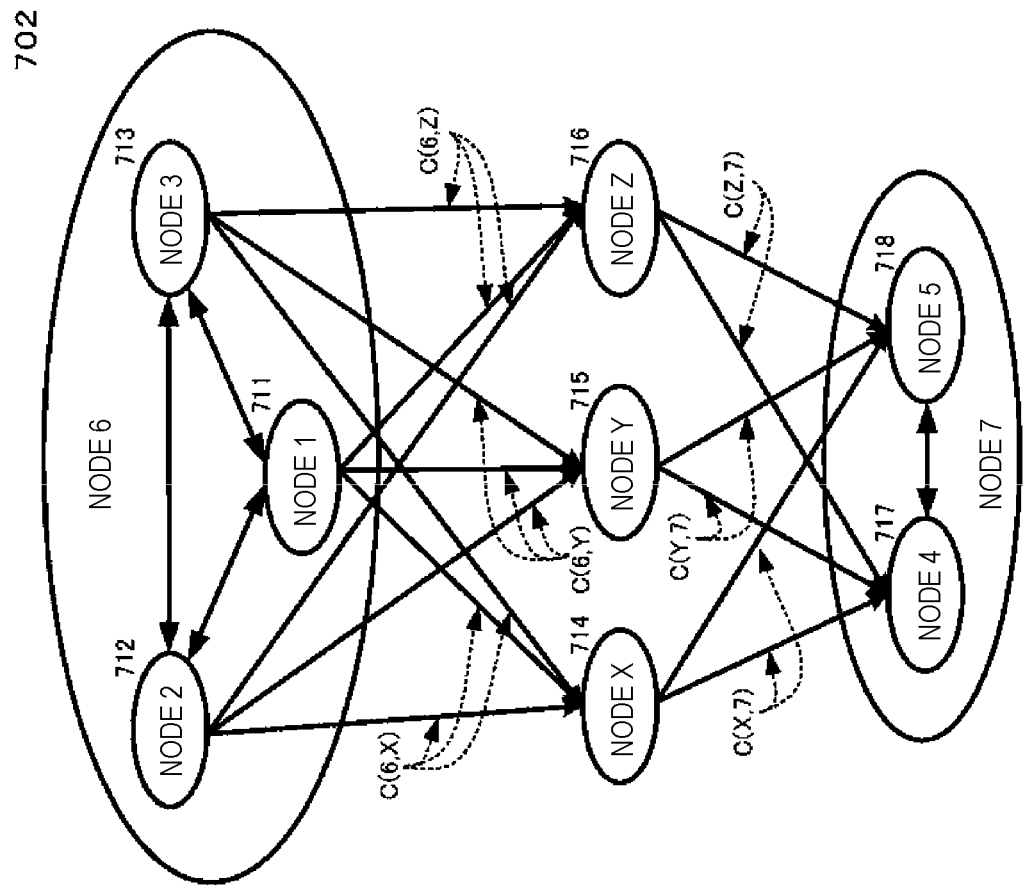
FIG. 7 shows an example of nodes for illustrating an example of calculating the number of link occurrences at a single node, and an example of calculating the number of link occurrences at an inclusive node, according to the exemplary embodiment of the present invention.
Figure 7:
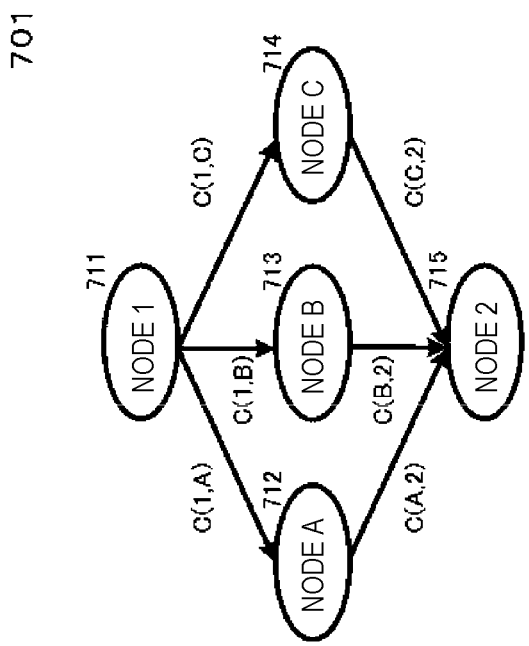

FIG. 7 shows an example of nodes for illustrating an example of calculating the number of edge occurrences at a single node, and an example of calculating the number of edge occurrences at an inclusive node, according to the exemplary embodiment of the present invention. The graph (701) shows character strings assigned to edges for calculating the number of edge occurrences at a single node. The computer (101) regards the character string as a predicate, and regards the number of occurrences as an object, and can generate a triple of the number of occurrences. The graph (702) shows an example of nodes for illustrating an example of calculating the number of edge occurrences in an inclusive node, and an example for calculating the number of edge occurrences at an inclusive node.

The computer (101) may calculate the number of occurrences of the edge in the inclusive node as the average value of the numbers of occurrences for respective edges.

$$C(6,X)=\{C(1,X)+C(2,X)+C(3,X)\}/3$$

$$C(X,7)=\{C(X,4)+C(X,5)\}/2$$

$$C(6,Y)=\{C(1,Y)+C(2,Y)+C(3,Y)\}/3$$

$$C(Y,7)=\{C(Y,4)+C(Y,5)\}/2$$

$$C(6,Z)=\{C(1,Z)+C(2,Z)+C(3,Z)\}/3$$

$$C(Z,7)=\{C(Z,4)+C(Z,5)\}/2$$

Figure 8:
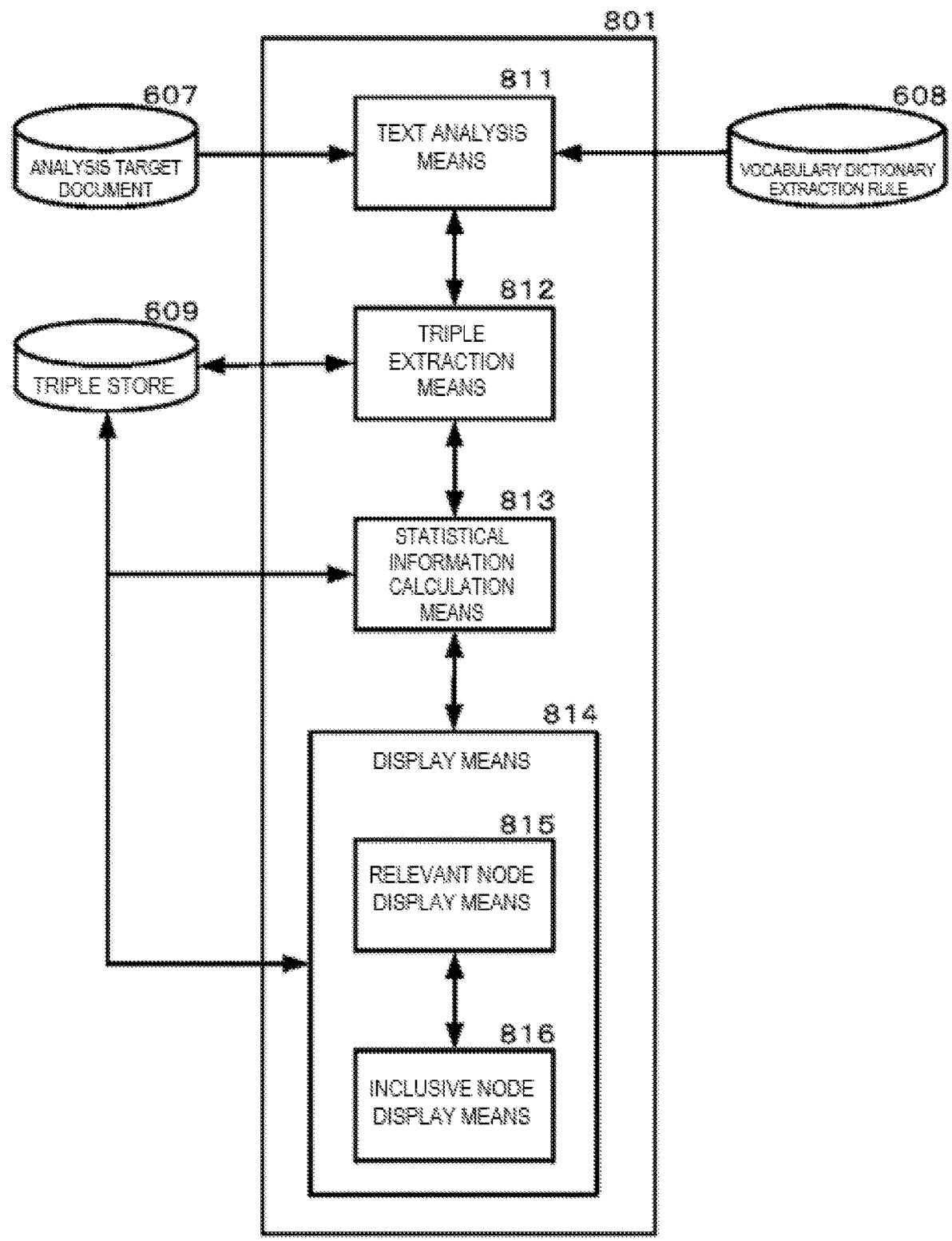
FIG. 8 is a diagram showing an example of a functional block diagram of a computer that preferably includes a hardware configuration in conformity with FIG. 1, and searches for relevant nodes according to the exemplary embodiment of the present invention.

FIG. 8 is a diagram showing an example of a functional block diagram of a computer that preferably includes the hardware configuration according to FIG. 1 and searches for relevant nodes according to the exemplary embodiment of the present invention.

The computer (101) includes text analysis means (811), triple extraction means (812), statistical information calculation means (813), and display means (814). The display means (814) includes relevant node display means (815), and inclusive node display means (816). The text analysis means (811) may include a computer different from the computer (101), a virtual computer or a thread.

The text analysis means (811) reads the analysis target document from the storing device or the storing medium (607) that stores the analysis target document. The text analysis means (811) text-analyzes the analysis target document, using the vocabulary dictionary extraction rule (608)

and using any method known to those skilled in the art. The text analysis means (811) may execute steps 602 and 603 shown in FIG. 6A.

The triple extraction means (812) receives data analyzed by the text analysis means (811), and extracts the triple from the data (see the table (501) and table (502) shown in FIG. 5A). The triple extraction means (812) may store the extracted triple in, for instance, the triple store (609). The triple extraction means (812) may acquire the number of occurrences (C) of the same triple in the analysis target document, and store the acquired number of occurrences, as a triple, in e.g. the triple store (609). The triple extraction means (812) may execute step 604 shown in FIG. 6A.

The statistical information calculation means (813) calculates statistical information on the basis of the triple extracted by the triple extraction means (812) and the triple on the number of occurrences acquired by the triple extraction means (812). For instance, the statistical information calculation means (813) calculates the first relevance and the second relevance using the triples.

The statistical information calculation means (813) may calculate: a value acquired from the number of occurrences of {subject-predicate-object} in the case of changing {object} with reference to each {subject-predicate}; a value acquired from the number of occurrences of {subject-predicate-object} in the case of changing {subject} with reference to each {predicate-object}; a value acquired from all the numbers of occurrences of designated {predicate}; and store the calculated values, as triples, in the triple store (609).

The statistical information calculation means (813) may further calculate: the scores on the respective edges of the nodes connected from the first node by two hops, on the basis of the number of occurrences of the same triple; a value acquired from the number of occurrences of {subject-predicate-object} in the case of changing {object} with reference to each {subject-predicate}; a value acquired from the number of occurrences of {subject-predicate-object} in the case of changing {subject} with reference to each {predicate-object}; a value acquired from all the numbers of occurrences of the designated {predicate}; and store the calculated scores in the triple store (609) as triples.

The statistical information calculation means (813) may calculate the foregoing (1) SA, (2) SS, (3) OA, (4) OS and (5) T for each designated predicate (type of edge).

If multiple edges exist between the first node and one node connected from the first node by two hops, the statistical information calculation means (813) may further calculate the score of all the multiple edges on the basis of the scores of the respective edges, and store the calculated score as the triple. The calculated score is a score from the first node to one node connected by two hops.

The statistical information calculation means (813) may execute step 605 shown in FIG. 6A, steps 621 to 626 shown in FIG. 6B, and step 612 shown in FIG. 6A.

In response to selection of the first node, the relevant node display means (815) displays, as first relevant nodes, nodes having a first relevance of at least the predetermined value among the nodes connected from the first node by two hops. In response to selection of at least one of the first relevant nodes, the inclusive node display means (816) displays the selected first relevant node as a second node involving the first node. The inclusive node display means (816) may further add internal links between the first node and the selected first relevant node. The inclusive node display means (816) further renormalize the first nodes and the selected first relevant nodes to have a zero hop. The relevant node display means (815) may further display, as second relevant nodes, nodes having a second relevance of at least the predetermined value among the nodes connected from the second node by two hops.

In response to selection of at least one of the second relevant nodes, the inclusive node display means (816) may further display the selected second relevant node as a third node involving the second node. The inclusive node display means (816) may further add internal links between the second node and the selected second relevant node. The inclusive node display means (816) may further renormalize the second node and the selected second relevant node to have a zero hop. The display means (814) may execute step 614 shown in FIG. 6A. The relevant node display means (815) may execute step 616 shown in FIG. 6A, and steps 631 to 640 shown in FIG. 6C. The inclusive node display means (816) may execute steps 615 and 617 shown in FIG. 6A, and steps 641 to 654 shown in FIG. 6D.

Figure 9:
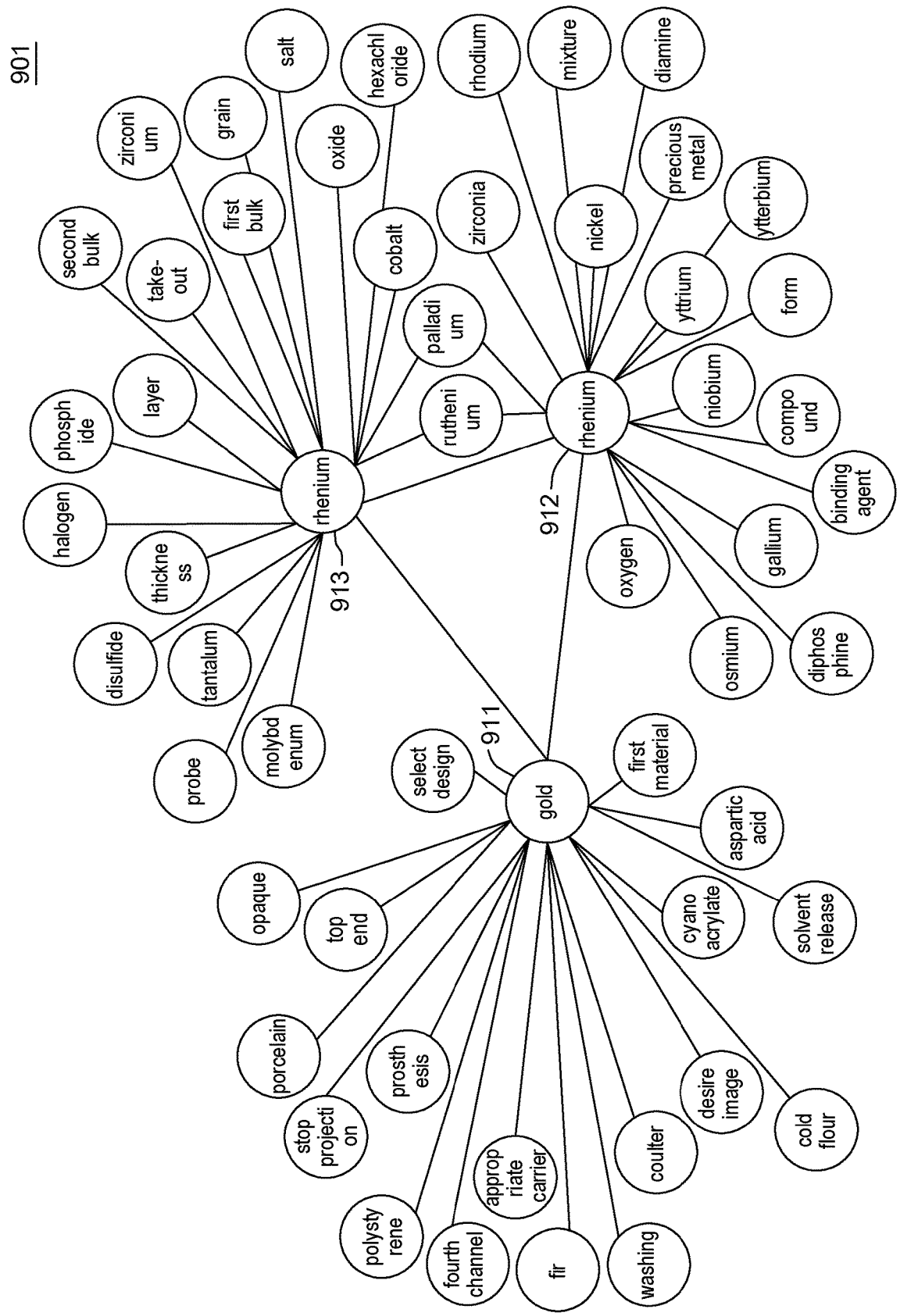
FIG. 9 is a diagram showing a result of searching for the relevant nodes according to the exemplary embodiment of the present invention.

FIG. 9 is a diagram showing a result of search for relevant nodes according to the exemplary embodiment of the present invention. The graph (901) shows a result of analysis of the disclosed invention according to the present invention. "Gold" (911) is designated as the starting node, and "iridium" (912) or "rhenium" (913) found as a relevant node of the "gold" is newly added as the starting node, thereby extracting words related to the "gold" (911), "iridium" (912) and "rhenium" (913) via verbs and other nouns. Such use of the graph (901) can find words with a similar context.

Various embodiments implementing the method of the present invention have been described above with reference to the accompanying drawings. Those skilled in the art may understand that the method may be implemented in software, hardware or a combination of software and hardware. Moreover, those skilled in the art may understand that by implementing various steps in the above method in software, hardware or a combination of software and hardware, there may be provided an apparatus for avoiding a transaction rollback based on the same inventive concept. Even if the apparatus has the same hardware structure as a general-purpose processing device, the functionality of software contained therein makes the apparatus manifest distinguishing properties from the general-purpose processing device, thereby forming an apparatus of the various embodiments of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for searching for relevant nodes, comprising:
    a relevant node display means configured to, in response to selection of a first node, display, as first relevant nodes, nodes having a first relevance of at least a predetermined value among nodes connected from the first node by two hops;
    an inclusive node display means configured to, in response to selection of at least one of the first relevant nodes, display the selected first relevant node as a second node involving the first node;
    a triple extraction means configured to extract at least one triple from data.

2. The computer system of claim 1, wherein the relevant node display means further displays, as second relevant nodes, nodes having a second relevance of at least a predetermined value among nodes connected from the second node by two hops.

3. The computer system of claim 2, wherein in response to selection of at least one of the second relevant nodes, the inclusive node display means further displays the selected second relevant node as a third node involving the second node.

4. The computer system of claim 1, wherein the at least one triple is represented by {subject-predicate-object}.

5. The computer system of claim 1, further comprising a statistical information calculation means configured to:
- calculate values acquired from a number of occurrences of the at least one triple; and
- calculate a relevance on an internal link added between a selected node and nodes connected from the selected node by two hops based on the values acquired from the number of occurrences of the at least one triple.

6. The computer system of claim 5, wherein at least one of the values is a value acquired from a number of occurrences of the at least one triple in a case of changing {object} with respect to each {subject-predicate}.

7. The computer system of claim 5, wherein at least one of the values is a value acquired from a number of occurrences of the at least one triple in a case of changing {subject} with respect to each {predicate-object}.

8. The computer system of claim 5, wherein at least one of the values is a value acquired from all numbers of occurrences designated {predicate}.

* * * * *